United States Patent
Zhang

(10) Patent No.: US 11,503,228 B2
(45) Date of Patent: Nov. 15, 2022

(54) IMAGE PROCESSING METHOD, IMAGE PROCESSING APPARATUS AND COMPUTER READABLE STORAGE MEDIUM

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 73 days.

(21) Appl. No.: 16/815,179

(22) Filed: Mar. 11, 2020

(65) Prior Publication Data

US 2020/0213533 A1 Jul. 2, 2020

Related U.S. Application Data

(63) Continuation of application No. PCT/CN2018/105121, filed on Sep. 11, 2018.

(30) Foreign Application Priority Data

Sep. 11, 2017 (CN) .......................... 201710811471.4
Sep. 11, 2017 (CN) .......................... 201710811778.4

(Continued)

(51) Int. Cl.
*H04N 5/272* (2006.01)
*H04N 9/73* (2006.01)
*H04N 5/235* (2006.01)
*G06T 7/194* (2017.01)
*G06T 7/50* (2017.01)
(Continued)

(52) U.S. Cl.
CPC .............. *H04N 5/272* (2013.01); *G06T 5/50* (2013.01); *G06T 7/0002* (2013.01); *G06T 7/174* (2017.01);
(Continued)

(58) Field of Classification Search
CPC ...... H04N 5/272; H04N 5/2354; H04N 9/735; H04N 5/2226; G06T 7/194; G06T 7/50;
(Continued)

(56) References Cited

U.S. PATENT DOCUMENTS

2002/0037103 A1\* 3/2002 Hong ...................... G06T 7/194
382/173
2003/0071905 A1\* 4/2003 Yamasaki ............ H04N 5/3415
348/E5.051
(Continued)

FOREIGN PATENT DOCUMENTS

CN 1306722 A 8/2001
CN 1411277 A 4/2003
(Continued)

OTHER PUBLICATIONS

Non-Final Office Action for U.S. Appl. No. 16/815,177 dated Dec. 13, 2021. (35 pages).
(Continued)

*Primary Examiner* — Abdelaaziz Tissire
(74) *Attorney, Agent, or Firm* — Young Basile Hanlon & MacFarlane, P.C.

(57) ABSTRACT

An image processing method, an image processing apparatus, an electronic device and a computer readable storage medium are provided. The image processing method includes the following. A background image and a portrait region image of a current user that a preset parameter of the background image matching the preset parameter of the portrait region image are acquired. The portrait region image and the background image are merged to obtain a merged image.

18 Claims, 16 Drawing Sheets

(30) Foreign Application Priority Data

| Sep. 11, 2017 | (CN) | 201710811814.7 |
| Sep. 11, 2017 | (CN) | 201710812003.9 |
| Sep. 11, 2017 | (CN) | 201710812062.6 |
| Sep. 11, 2017 | (CN) | 201710812524.4 |
| Sep. 11, 2017 | (CN) | 201710812528.2 |
| Sep. 11, 2017 | (CN) | 201710812662.2 |
| Sep. 11, 2017 | (CN) | 201710813504.9 |
| Sep. 11, 2017 | (CN) | 201710813584.8 |
| Sep. 11, 2017 | (CN) | 201710813585.2 |
| Sep. 11, 2017 | (CN) | 201710813591.8 |
| Sep. 11, 2017 | (CN) | 201710813674.7 |

(51) Int. Cl.
  *G06T 7/174* (2017.01)
  *G06T 5/50* (2006.01)
  *G06T 7/00* (2017.01)

(52) U.S. Cl.
  CPC ............ *G06T 7/194* (2017.01); *G06T 7/50* (2017.01); *H04N 5/2354* (2013.01); *H04N 9/735* (2013.01); *G06T 2207/20221* (2013.01); *G06T 2207/30201* (2013.01)

(58) Field of Classification Search
  CPC ......... G06T 7/174; G06T 5/50; G06T 7/0002; G06T 2207/20221; G06T 2207/30201; G06T 2207/10016; G06T 2207/10028; G06T 2207/10024; G06T 7/521; G01B 11/25; G06K 9/00281; G06K 9/00201; G06K 9/2036
  See application file for complete search history.

(56) References Cited

U.S. PATENT DOCUMENTS

| 2004/0212725 | A1* | 10/2004 | Raskar | H04N 5/2256 |
| | | | | 348/370 |
| 2005/0195317 | A1* | 9/2005 | Myoga | H04N 5/23229 |
| | | | | 348/370 |
| 2006/0029275 | A1* | 2/2006 | Li | G06T 11/60 |
| | | | | 382/218 |
| 2006/0187321 | A1* | 8/2006 | Sakamoto | H04N 1/6086 |
| | | | | 348/E9.055 |
| 2009/0167928 | A1* | 7/2009 | Asukabe | H04N 5/2356 |
| | | | | 348/345 |
| 2011/0109620 | A1* | 5/2011 | Hong | G06T 11/001 |
| | | | | 382/167 |
| 2011/0299772 | A1 | 12/2011 | Janssen | |
| 2012/0229650 | A1* | 9/2012 | Matthews | G06K 9/6289 |
| | | | | 348/E5.085 |
| 2013/0136350 | A1* | 5/2013 | Pai | G06T 7/11 |
| | | | | 382/165 |
| 2013/0229413 | A1 | 9/2013 | Geggie et al. | |
| 2014/0362188 | A1* | 12/2014 | Yokokawa | G06F 3/011 |
| | | | | 348/47 |
| 2016/0057363 | A1 | 2/2016 | Posa | |
| 2016/0191898 | A1* | 6/2016 | Xu | H04N 5/23238 |
| | | | | 348/47 |
| 2016/0364602 | A1* | 12/2016 | Kim | G06V 10/60 |
| 2017/0019651 | A1* | 1/2017 | Kitajima | H04N 9/77 |
| 2018/0115717 | A1 | 4/2018 | Kao et al. | |
| 2020/0211197 | A1* | 7/2020 | Zhang | G06T 7/593 |

FOREIGN PATENT DOCUMENTS

| CN | 101150737 A | 3/2008 |
| CN | 101577831 A | 11/2009 |
| CN | 101677386 A | 3/2010 |
| CN | 101835023 A | 9/2010 |
| CN | 102663810 A | 9/2012 |
| CN | 102868872 A | 1/2013 |
| CN | 103104839 A | 5/2013 |
| CN | 103606182 A | 2/2014 |
| CN | 103685976 A | 3/2014 |
| CN | 103985114 A | 8/2014 |
| CN | 104182950 A | 12/2014 |
| CN | 104268928 A | 1/2015 |
| CN | 104486606 A | 4/2015 |
| CN | 104599314 A | 5/2015 |
| CN | 104660918 A | 5/2015 |
| CN | 104853172 A | 8/2015 |
| CN | 104902189 A | 9/2015 |
| CN | 104917938 A | 9/2015 |
| CN | 105100491 A | 11/2015 |
| CN | 105187810 A | 12/2015 |
| CN | 105227837 A | 1/2016 |
| CN | 105306862 A | 2/2016 |
| CN | 105430317 A | 3/2016 |
| CN | 105450949 A | 3/2016 |
| CN | 105741343 A | 7/2016 |
| CN | 105868735 A | 8/2016 |
| CN | 105872400 A | 8/2016 |
| CN | 105872448 A | 8/2016 |
| CN | 205430735 U | 8/2016 |
| CN | 106027916 A | 10/2016 |
| CN | 106303162 A | 1/2017 |
| CN | 106303250 A | 1/2017 |
| CN | 106340025 A | 1/2017 |
| CN | 106412643 A | 2/2017 |
| CN | 106447741 A | 2/2017 |
| CN | 106485720 A | 3/2017 |
| CN | 106502512 A | 3/2017 |
| CN | 106534683 A | 3/2017 |
| CN | 106548455 A | 3/2017 |
| CN | 106612393 A | 5/2017 |
| CN | 106791473 A | 5/2017 |
| CN | 106803888 A | 6/2017 |
| CN | 106844722 A | 6/2017 |
| CN | 106850941 A | 6/2017 |
| CN | 106851124 A | 6/2017 |
| CN | 106851238 A | 6/2017 |
| CN | 106909911 A | 6/2017 |
| CN | 106937039 A | 7/2017 |
| CN | 106937049 A | 7/2017 |
| CN | 106937059 A | 7/2017 |
| CN | 106954034 A | 7/2017 |
| CN | 106980381 A | 7/2017 |
| CN | 206322194 U | 7/2017 |
| CN | 106997603 A | 8/2017 |
| CN | 107025635 A | 8/2017 |
| CN | 107087123 A | 8/2017 |
| CN | 107096224 A | 8/2017 |
| CN | 107610077 A | 1/2018 |
| CN | 107610078 A | 1/2018 |
| CN | 107610080 A | 1/2018 |
| CN | 107613224 A | 1/2018 |
| CN | 107644439 A | 1/2018 |
| CN | 107665478 A | 2/2018 |
| CN | 107682645 A | 2/2018 |
| CN | 107705277 A | 2/2018 |
| CN | 107707831 A | 2/2018 |
| CN | 107707834 A | 2/2018 |
| CN | 107707838 A | 2/2018 |
| CN | 107734264 A | 2/2018 |
| CN | 107734267 A | 2/2018 |
| CN | 108256497 A | 7/2018 |
| EP | 1100262 A1 | 5/2001 |
| JP | 2004134950 A * | 4/2004 |
| JP | 2006229616 A | 8/2006 |
| JP | 2016123517 A | 7/2016 |
| WO | 2009155204 A2 | 12/2009 |
| WO | 2019047985 A1 | 3/2019 |

OTHER PUBLICATIONS

Chinese Notice of Review with English Translation for CN Application 201710813584.8 dated Dec. 21, 2021. (38 pages).

(56) References Cited

OTHER PUBLICATIONS

English translation of OA for CN application 201710812003.9.
English translation of OA for CN application 201710812062.6.
English translation of OA for CN application 201710812662.2.
English translation of OA for CN application 201710813585.2.
English translation of OA date Aug. 1, 2019 for CN application 201710813584.8.
English translation of Reconnaissance image acquisition and fusion technology.
English translation of OA date Nov. 14, 2019 for CN application 201710813584.8.
English translation of OA for CN application 201710812528.2.
English translation of OA for CN application 201710813674.7.
English translation of OA date Apr. 22, 2019 for CN application 201710813591.8.
English translation of OA date Oct. 8, 2019 for CN application 201710813591.8.
English translation of OA for CN application 201710812524.4.
English translation of OA date May 20, 2019 for CN application 201710811814.7.
English translation of OA date Dec. 3, 2019 for CN application 201710811814.7.
English translation of OA for CN application 201710813504.9.
English translation of OA date May 25, 2019 for CN application 201710811778.4.
English translation of OA date Nov. 29, 2019 for CN application 201710811778.4.
English translation of OA for CN application 201710811471.4.
English translation of Decision of Rejection 201710811471.4.
English translation of ISR for PCT application PCT/CN2018/105121.
China Rejection with English Translation for CN Application 201710812003.9 dated Nov. 2, 2020.
China Rejection with English Translation for CN Application 201710811814.7 dated Dec. 14, 2020.
Extended European Search Report for EP Application 18852861.6 dated Oct. 2, 2020.
Automatic Real-Time Video Matting Using Time-of-Flight Camera and Multichannel Poisson Equations; Liang Wang • Minglun Gong • Chenxi Zhang; Received: Sep. 9, 2010 | Accepted: May 23, 2011 /Published online: Jun. 15, 2011 © Springer Science+Business Media, LLC 2011; 18 pages.
Human Detection Using Depth Information by Kinect; Lu Xia, Chia-Chih Chen and J. K. Aggarwal; The University of Texas at Austin; Department of Electrical and Computer Engineering; 8 pages.
Tangible Video Teleconference System Using Real-Time Image-Based Relighting; Sae-Woon Ryu, Sang Hwa Lee, Sang Chul Ahn, and Jong-Il Park, Member, IEEE; IEEE Transactions on Consumer Electronics, vol. 55, No. 3, Aug. 2009; 7 pages.
Practical automatic background substitution for live video; Haozhi Huang1 , Xiaonan Fang1, Yufei Ye1 , Songhai Zhang1 (IBI), and Paul L. Rosin2; Computational Visual Media DOI 10.1007 /s41095-016-0074-0; vol. 3, No. 3, Sep. 2017, 273-284; 12 pages.
Towards Real-time Mixed Reality Matting in Natural Scenes; Nicholas Beato; University of Florida; Stars; 108 pages.
New Trends on Dynamic Object Segmentation in Video Sequences: A Survey; Ramirez A. Graciela and Chacon M. Mario I.; vol. 11 No. I, Dec. 2013; 14 pages.
Indian Examination Report for IN Application 202017015758 dated Jul. 15, 2021. (7 pages).
Chinese Notice of review of Office Action with English Translation for CN Application 201710812528.2, dated Aug. 10, 2022 (21 pages).

* cited by examiner acquiring a background image and a portrait region image of a current user that a preset parameter of the background image matches the preset parameter of the portrait region image — 101 merging the portrait region image and the background image to obtain a merged image — 102 truncated phase image of the object to be measured truncated phase image of the reference plane continuous phase image of the object to be measured continuous phase image of the reference plane

IMAGE PROCESSING METHOD, IMAGE PROCESSING APPARATUS AND COMPUTER READABLE STORAGE MEDIUM

CROSS-REFERENCE TO RELATED APPLICATION(S)

This application is a continuation application of International Patent Application No. PCT/CN2018/105121, filed on Sep. 11, 2018, which claims priority to Chinese Patent Application Nos. 201710813591.8, 201710811471.4, 201710812528.2, 201710812662.2, 201710811814.7, 201710813584.8, 201710811778.4, 201710812062.6, 201710813504.9, 201710812003.9, 201710813674.7, 201710813585.2, and 201710812524.4, all filed on Sep. 11, 2017, the entire disclosure of all of which are hereby incorporated by reference in their entireties.

TECHNICAL FIELD

The present disclosure relates to image processing technologies, and more particularly, to an image processing method, an image processing apparatus, an electronic device and a computer readable storage medium.

BACKGROUND

An existing technology of merging a portrait and a virtual background usually extracts a portrait to be merged from an image including the portrait, and adds the extracted portrait to the virtual background.

SUMMARY

The image processing method includes: acquiring a background image and a portrait region image of a current user, a preset parameter of the background image matching the preset parameter of the portrait region image; and merging the portrait region image and the background image to obtain a merged image.

The image processing apparatus according to implementations of the present disclosure is integrated in the electronic device. The image processing apparatus includes a visible light camera, a depth image collection component and a processor. The visible light camera and the depth image collection component are configured to acquire a background image and a portrait region image of a current user, a preset parameter of the background image matching the preset parameter of the portrait region image. The processor is configured to merge the portrait region image and the background image to obtain a merged image.

The computer readable storage medium according to implementations of the present disclosure includes a computer program that may be used in combination with an electronic device capable of photographing, wherein the computer program may be executed by a processor to implement the image processing method as described above.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The above and additional aspects and advantages of embodiments of the present disclosure will become apparent and more readily appreciated from the following descriptions made with reference to the accompanying drawings, in which.

DETAILED DESCRIPTION

Embodiments of the present disclosure are described below in detail and examples of the embodiments are shown in accompanying drawings. Same or similar reference signs throughout the description represent the same or similar components or components that have the same or similar functions. Embodiments described below with reference to the accompanying drawings are exemplary, intended to explain the present disclosure, and not construed to limit the present disclosure.

In a practical application, two images to be merged may have differences from each other. As a result, a merged image obtained by simply translating and resizing may have a poor merging effect.

Therefore, the present disclosure provides an image processing method, an image processing apparatus, an electronic device, and a storage medium.

An image processing method and an image processing apparatus according to embodiments of the present disclosure will be described below with reference to the accompanying drawings.

Figures 1, 2:
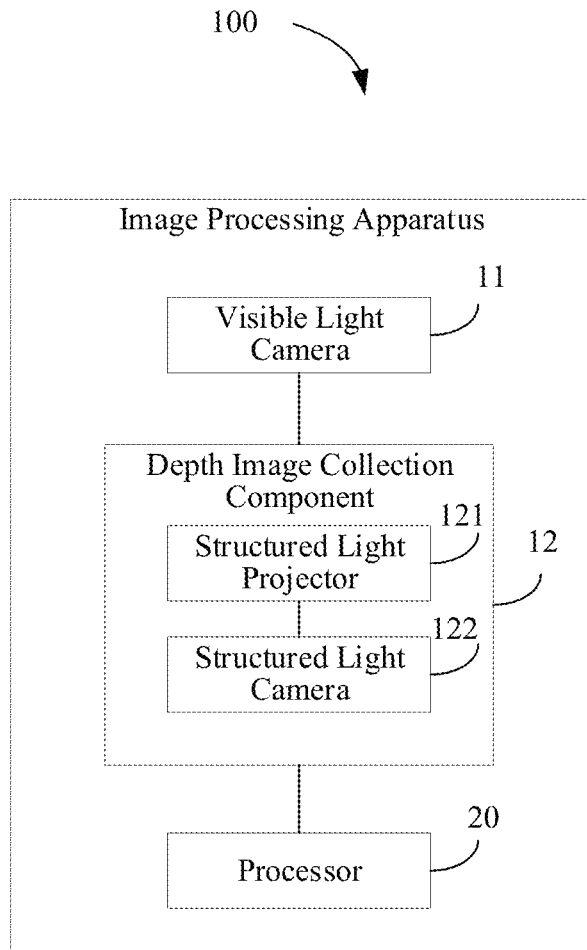
FIG. 1 is a schematic flowchart illustrating an image processing method according to embodiments of the present disclosure.
FIG. 2 is a schematic block diagram illustrating an image processing apparatus according to embodiments of the present disclosure.

FIG. 1 is a schematic flowchart illustrating an image processing method according to some implementations of the present disclosure. As illustrated in FIG. 1, the method may include the following.

At block 101, a background image and a portrait region image of a current user are acquired. A preset parameter of the background image matches the preset parameter of the portrait region image.

At block 102, the portrait region image and the background image are merged to obtain a merged image.

Figure 3:
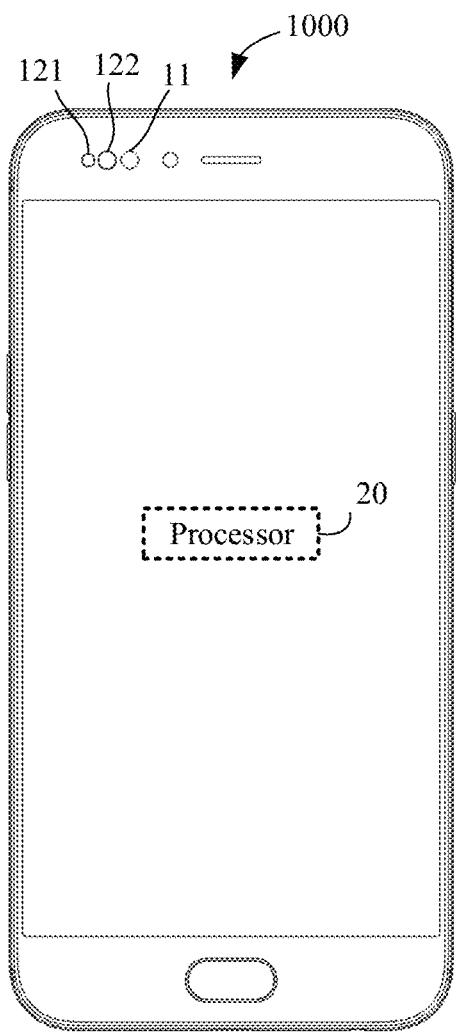
FIG. 3 is a schematic block diagram illustrating an electronic device according to embodiments of the present disclosure.

As illustrated in FIGS. 2 and 3, the image processing method according to implementations of the present disclosure may be implemented by an image processing apparatus 100 according to implementations of the present disclosure. The image processing apparatus 100 according to implementations of the present disclosure is integrated in an electronic device 1000. As illustrated in FIG. 2, the image processing apparatus 100 may include a visible light camera 11, a depth image collection component 12 and a processor 20. The block 101 may be implemented by the visible light camera 11 and the depth image collection component 12, and the block 102 may be implemented by the processor 20.

In other words, the visible light camera 11 and the depth image collection component 12 may be configured to acquire the background image and the portrait region image of the current user having the preset parameter matching the preset parameter of the background image. The processor 20 may be configured to merge the portrait region image and the background image to obtain the merged image.

The image processing apparatus 100 according to implementations of the present disclosure may be integrated in the electronic device 1000 according to implementations of the present disclosure. That is, the electronic device 1000 according to implementations of the present disclosure includes the image processing apparatus 100 according to implementations of the present disclosure.

In some implementations, the electronic device 1000 may include a phone, a tablet computer, a notebook computer, a smart bracelet, a smart watch, a smart helmet, smart glasses, and the like.

With the image processing method according to embodiments of the present disclosure, the background image and the portrait region image of the current user that the preset parameter of the background image matches the preset parameter of the portrait region image are acquired and the portrait region image and the background image are merged to obtain the merged image. Therefore, since the preset parameter of the background image matches the preset parameter of the portrait region image, the portrait region image and the background image may be naturally merged, thereby improving visual effect of image processing.

Figure 4:
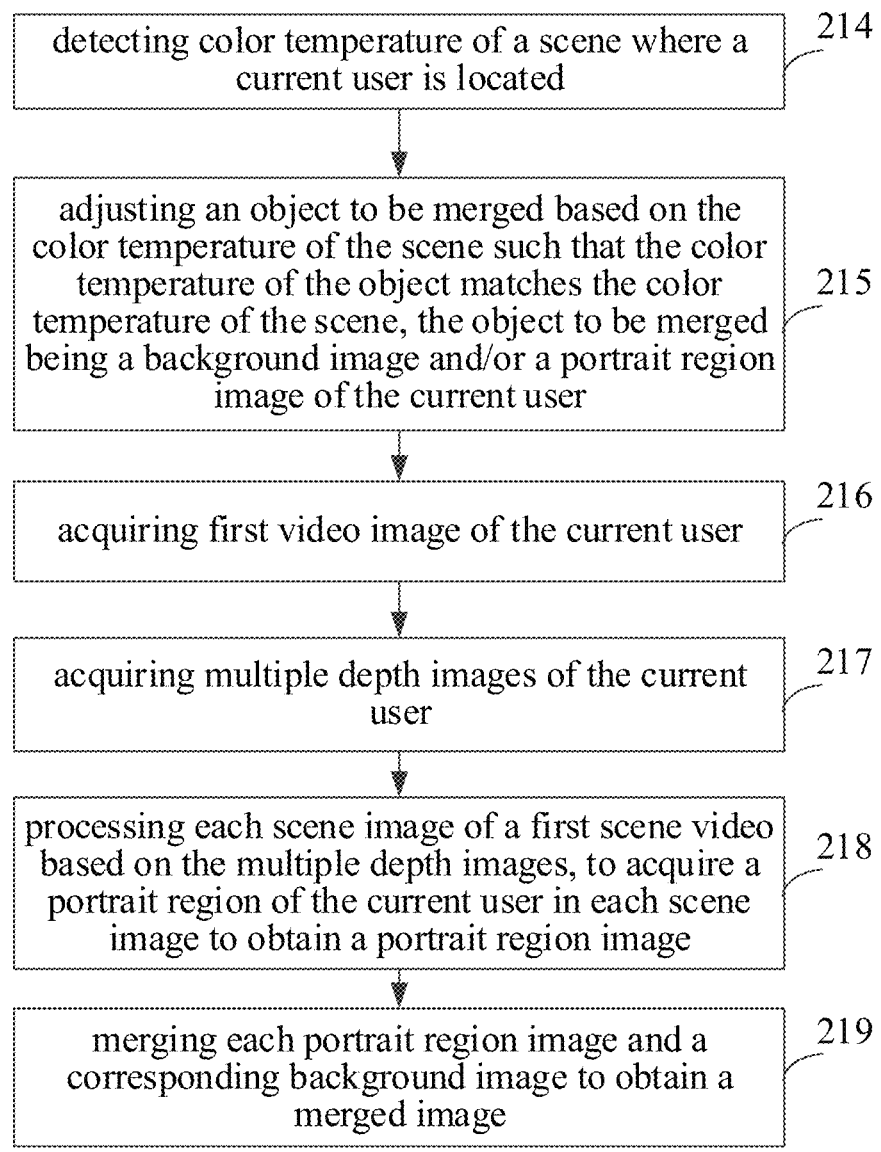
FIG. 4 is a schematic flowchart illustrating an image processing method according to embodiments of the present disclosure.

As illustrated in FIG. 4, in some implementations, the preset parameter may include a color temperature, and the block 101 may include the following.

At block 214, the color temperature of the scene where the current user is located is detected.

At block 215, an object to be merged is adjusted based on the color temperature of the scene such that the color temperature of the object to be merged matches the color temperature of the scene. The object to be merged is a selected background image and/or the portrait region image of the current user.

At block 216, a first video image of the current user is acquired.

At block 217, multiple depth images of the current user are acquired.

At block 218, each scene image of a first scene video is processed based on the multiple depth images, to acquire the portrait region of the current user in each scene image to obtain the portrait region image.

The block 102 may include a block 219.

At block 219, each portrait region image and a corresponding background image are merged to obtain the merged image.

The blocks 214 and 215 may be implemented by the visible light camera 11, the block 216 may be implemented by the depth image collection component 12, and the blocks 217, 218 and 219 may be implemented by the processor 20.

In an embodiment of the present disclosure, the visible light camera 11 may be configured to detect the color temperature of the scene where the current user is located through an internal photosensitive chip during shooting the scene. After the color temperature of the scene is obtained, in order to well merge the portrait and the background image to be merged, the processor 20 may be configured to adjust the color temperature of the scene and/or the background image to be merged based on the color temperature of the scene, such that the color temperature of the scene matches the color temperature of the background image and differences of the color temperatures in the merged image are almost invisible to human eyes. Consequently, the merging effect is good and the user experience is improved.

In some application scenarios, for example, it is desired to hide a current background while the current user is in a video chat with another, with the image processing method according to implementations of the present disclosure, the portrait region image corresponding to the current user and the preset background may be merged, and the merged image is displayed to the another.

The blocks 214 and 215 may be implemented by the visible light camera 11, the block 216 may be implemented by the depth image collection component 12, and the blocks 217, 218 and 219 may be implemented by the processor 20.

In embodiments of the present disclosure, the visible light camera 11 may be configured to detect the color temperature of the scene where the current user is located through the internal photosensitive chip during shooting the scene. After the color temperature of the scene is obtained, in order to well merge the portrait and the background image to be merged, the processor 20 may be configured to adjust the color temperature of the scene and/or the background image to be merged based on the color temperature of the scene, such that the color temperature of the scene matches the color temperature of the background image and differences of the color temperatures in the merged image are almost invisible to human eyes. Consequently, the merging effect is good and the user experience is improved.

After the color temperature of the scene is obtained, the processor 20 may be further configured to acquire the color temperature of the background image to be merged, and compare the color temperature of the scene with the color temperature of the background image to be merged to determine whether the color temperature of the scene matches the color temperature of the background image to be merged. In detail, after the color temperature of the scene and the color temperature of the background image are obtained, the processor 20 is configured to compare the color temperature of the scene and the color temperature of the background image to be merged to obtain a difference between the two color temperatures. In a case that the difference exceeds a preset color temperature threshold, it indicates that the color temperature of the scene does not match the color temperature of the background image, and needs to adjust the object to be merged. In some implementations, in a case that the two color temperatures do not match to each other, one or both of the color temperatures may be adjusted. For a specific adjustment process, reference may be made to subsequent descriptions, which is not described here.

After the color temperature of the scene and/or the background image to be merged is adjusted based on the color temperature of the scene such that the color temperature of the scene matches the color temperature of the background image, the visible light camera 11 may be configured to continuously shoot the scene to obtain first video images of the current user. In embodiments, the first video images include multiple scene images.

Further, the depth image collection component 12 may be configured to acquire multiple depth images of the current user. The scene image may be a grayscale image or a color image. The depth image characterizes depth information including depth information of each person or object included in the scene of the current user. A scene range of the scene image is consistent with a scene range of the depth image, and each pixel in the scene image may have respective depth information corresponding to that pixel provided by the depth image.

During a video shooting process, the user is usually in a moving state and a position of the user may be changed continuously. In this case, each scene image in the first video image may correspond to a respective depth image. In another example, the user does not move in multiple scene images, multiple scene images in the first video image may correspond to a single depth image.

Further, the processor 20 may be configured to process each scene image of the first scene video based on the multiple depth images to obtain the portrait region of the current user in the scene image, to obtain the portrait region image, and to merge each portrait region image and a corresponding background image to obtain a merged image.

An existing method of separating a portrait and a background is mainly to separate the portrait and the background based on the similarity and discontinuity of neighboring pixels in pixel values. This method is susceptible to environmental factors such as ambient luminance. The image processing apparatus 100 and the electronic device 1000 according to embodiments of the present disclosure may obtain the depth image of the current user to extract the portrait region from the scene image. Since acquisition of the depth image is insusceptible to factors such as luminance or color distribution in the scene, the portrait region extracted from the depth image may be more accurate. Particularly, boundaries of the portrait region may be accurately marked. Further, the merged image obtained by merging the accurate portrait region and the background may present a better effect.

With the image processing method according to embodiments of the present disclosure, the color temperature of the scene where the user is located is detected and the color temperature of the object to be merged is adjusted based on the color temperature of the scene, such that the color temperature of the scene matches the color temperature of the background image to be merged, thereby obtaining the merged image with satisfying merging effect by merging the portrait region image extracted from the scene image and the background image. The color temperature is taken into consideration during the merging process, such that the portrait and the background image may be merged naturally, improve the merging effect, and improve the user experience.

In a case that the color temperature of the scene does not match the color temperature of the background image to be merged, one or both of the two color temperatures may be adjusted. In some implementations, the color temperature of the background image to be merged is adjusted based on the color temperature of the scene to adjust or change the color temperature of the background image, such that the color temperature of the scene matches the color temperature of the background image.

Figure 5:
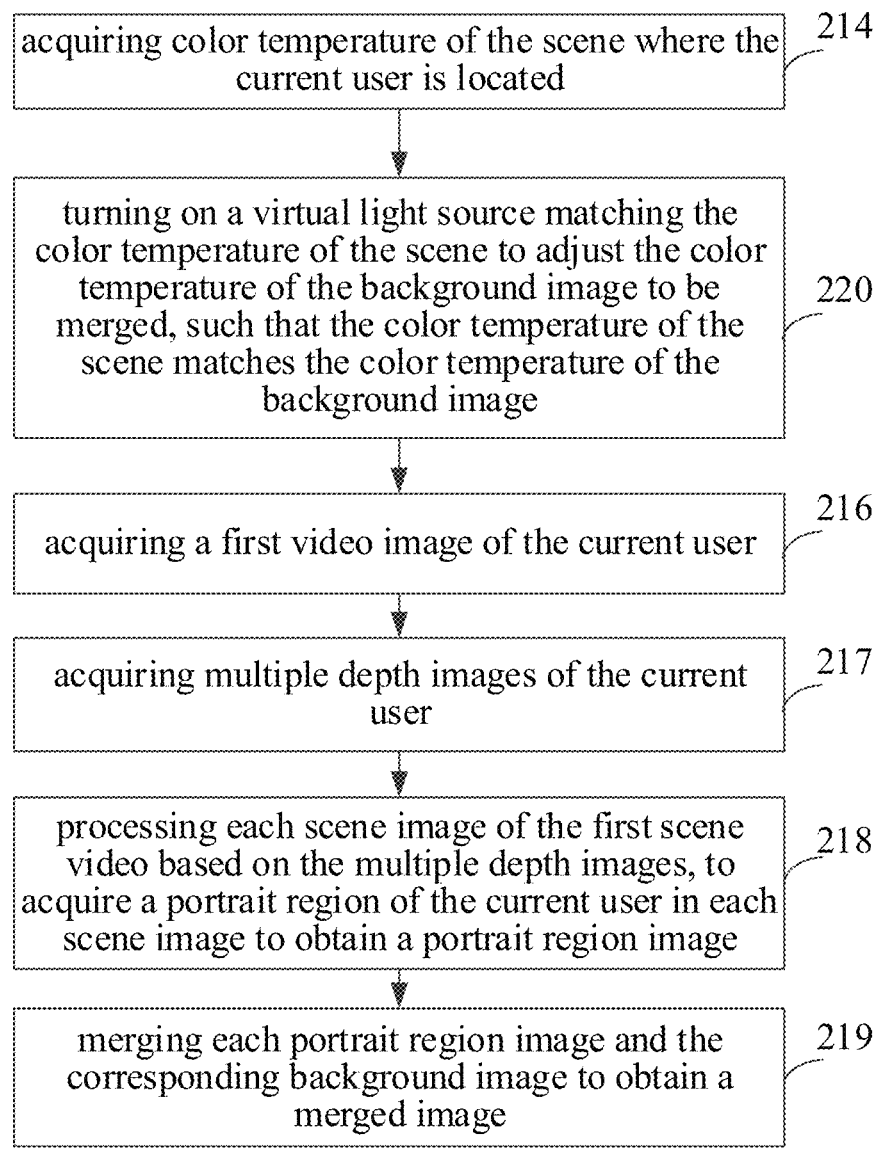
FIG. 5 is a schematic flowchart illustrating an image processing method according to embodiments of the present disclosure.

As illustrated in FIG. 5, in some implementations, the preset parameter may include the color temperature, and the block 101 may include the following.

At block 214, color temperature of the scene where the current user is located is detected.

At block 220, a virtual light source matching the color temperature of the scene is turned on to adjust the color temperature of the background image to be merged, such that the color temperature of the scene matches the color temperature of the background image.

At block 216, the first video image of the current user is acquired.

At block 217, multiple depth images of the current user are acquired.

At block 218, each scene image of the first scene video is processed based on the multiple depth images, to acquire the portrait region of the current user in each scene image to obtain the portrait region image.

The block 102 may include a block 219.

At block 219, each portrait region image and the corresponding background image are merged to obtain the merged image.

In other words, in a case where the background image is adjusted based on the color temperature of the scene such that the color temperature of the scene may match the color temperature of the background image, the block 215 may include the block 220.

Figure 6:
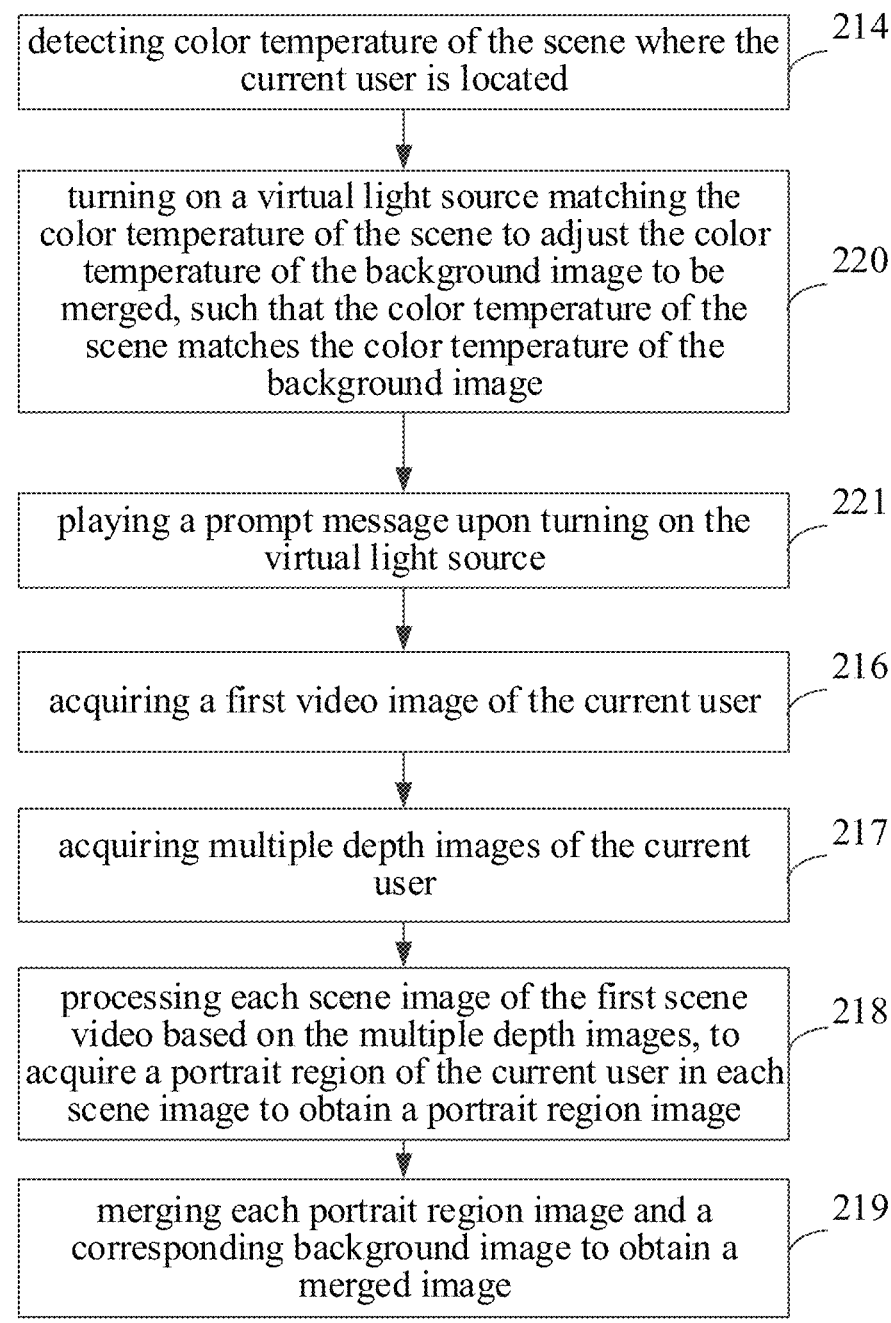
FIG. 6 is a schematic flowchart illustrating an image processing method according to embodiments of the present disclosure.

As illustrated in FIG. 6, in some implementations, the preset parameter may include the color temperature, and the block 101 may include the following.

At block 214, color temperature of the scene where the current user is located is detected.

At block 220, a virtual light source matching the color temperature of the scene is turned on to adjust the color temperature of the background image to be merged, such that the color temperature of the scene matches the color temperature of the background image.

At block 221, a prompt message is played upon turning on the virtual light source.

At block 216, a first video image of the current user is acquired.

At block 217, multiple depth images of the current user are acquired.

At block 218, each scene image of the first scene video is processed based on the multiple depth images, to acquire the portrait region of the current user in each scene image to obtain the portrait region image.

The block 102 may include a block 219.

At block 219, each portrait region image and the corresponding background image are merged to obtain the merged image.

In other words, in a case where the background image is adjusted based on the color temperature of the scene such that the color temperature of the scene matches the color temperature of the background image, the block 215 may include the blocks 220 and 221.

In embodiments of the present disclosure, in order to add sound in merging images, an event of turning on the virtual light source may be taken as a listening event. When the processor 200 listens that the virtual light source is turned on, the processor 200 is configured to add a prompt message of turning on a switch upon turning on the virtual light source. The prompt message may be sound or vibration.

Figure 7:
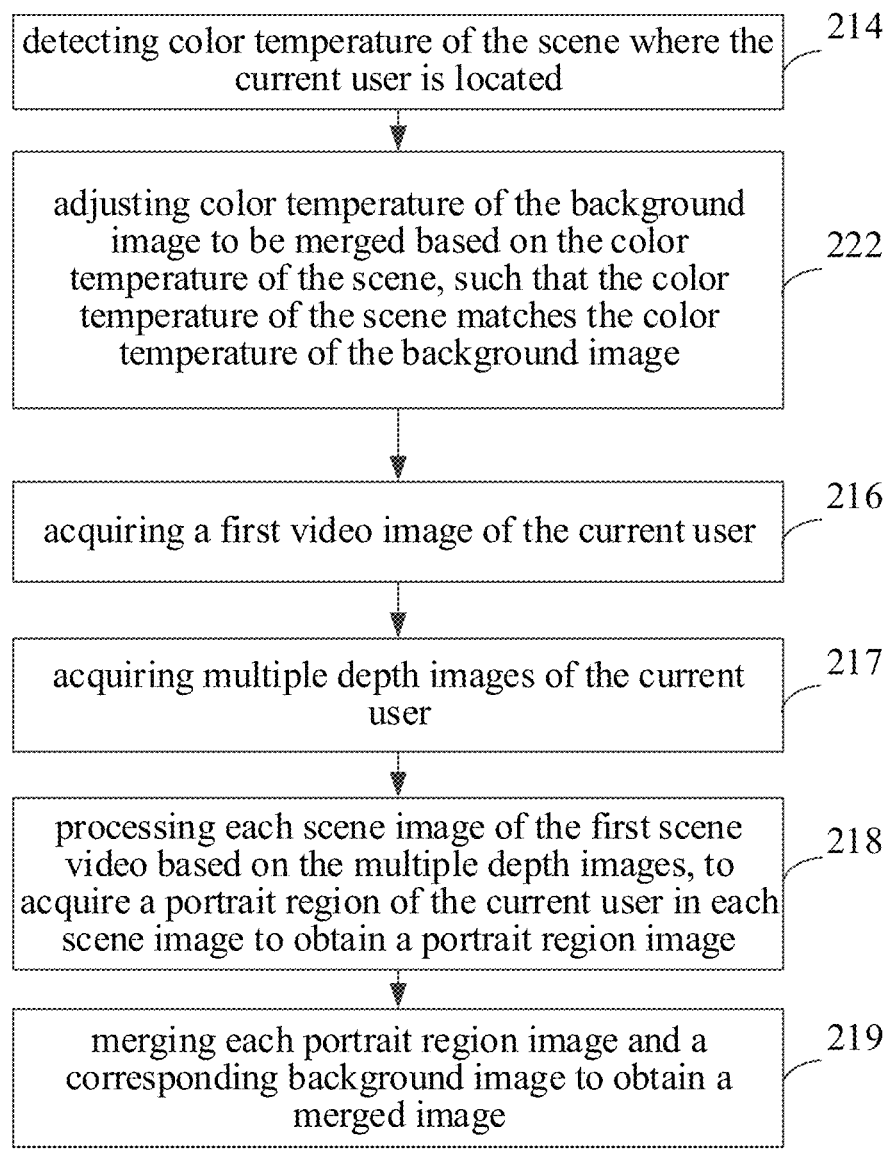
FIG. 7 is a schematic flowchart illustrating an image processing method according to embodiments of the present disclosure.

As illustrated in FIG. 7, in some implementations, the preset parameter may include the color temperature, and the block 101 may include the following.

At block 214, color temperature of the scene where the current user is located is detected.

At block 222, color temperature of the background image to be merged is adjusted using the color temperature of the scene, such that the color temperature of the scene matches the color temperature of the background image.

At block 216, a first video image of the current user is acquired.

At block 217, multiple depth images of the current user are acquired.

At block 218, each scene image of the first scene video is processed based on the multiple depth images, to acquire the portrait region of the current user in each scene image to obtain the portrait region image.

The block 102 may include a block 219.

At block 219, each portrait region image and the corresponding background image are merged to obtain the merged image.

In other words, in a case where the background image is adjusted based on the color temperature of the scene such that the color temperature of the scene matches the color temperature of the background image, the block 215 may include the block 222.

Figure 8:
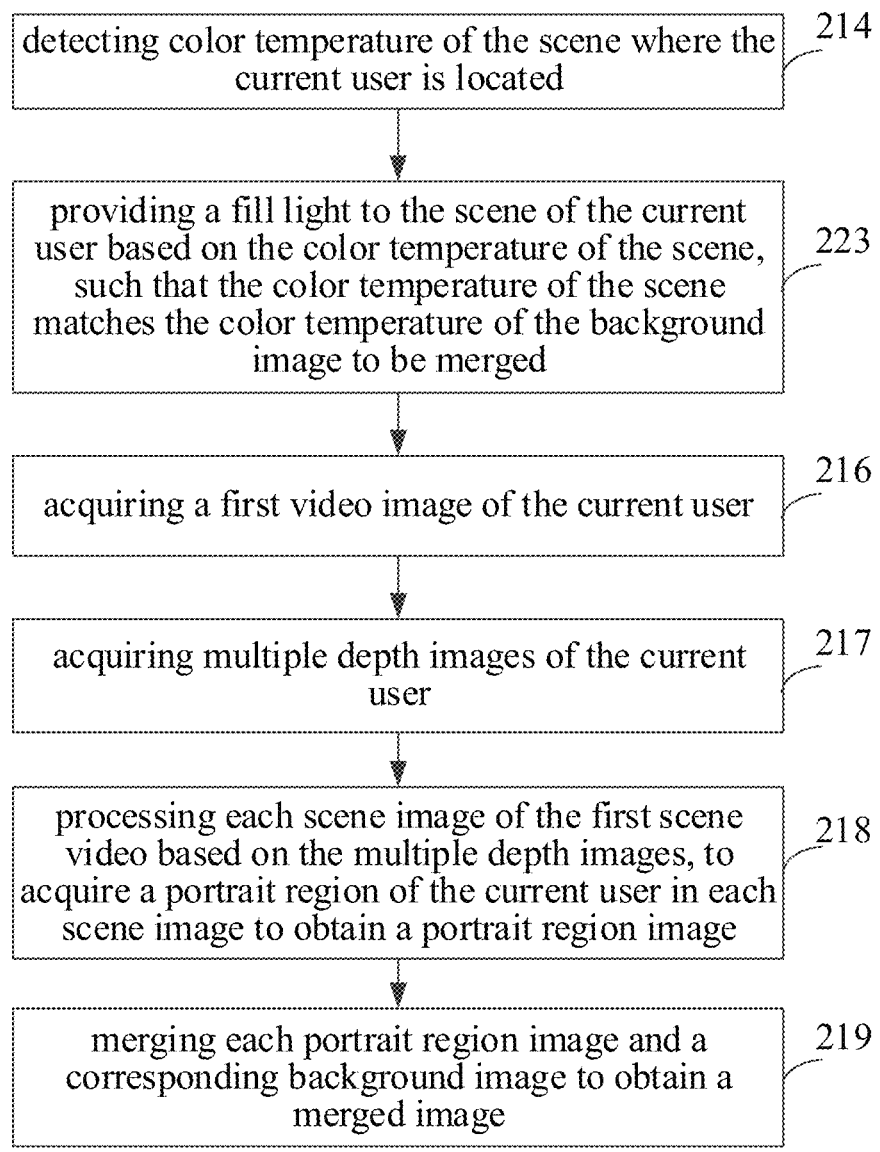
FIG. 8 is a schematic flowchart illustrating an image processing method according to embodiments of the present disclosure.

As illustrated in FIG. 8, in some implementations, the preset parameter may include the color temperature, and the block 101 may include the following.

At block 214, color temperature of the scene where the current user is located is detected.

At block 223, a fill light is provided to the scene of the current user based on the color temperature of the scene, such that the color temperature of the scene matches the color temperature of the background image to be merged.

At block 216, a first video image of the current user is acquired.

At block 217, multiple depth images of the current user are acquired.

At block 218, each scene image of the first scene video is processed based on the multiple depth images, to acquire the portrait region of the current user in each scene image to obtain the portrait region image.

The block 102 may include a block 219.

At block 219, each portrait region image and the corresponding background image are merged to obtain the merged image.

In other words, in a case where the color temperature of the scene is adjusted such that the color temperature of the scene matches the color temperature of the background image, the block 215 may include the block 223.

Figure 9:
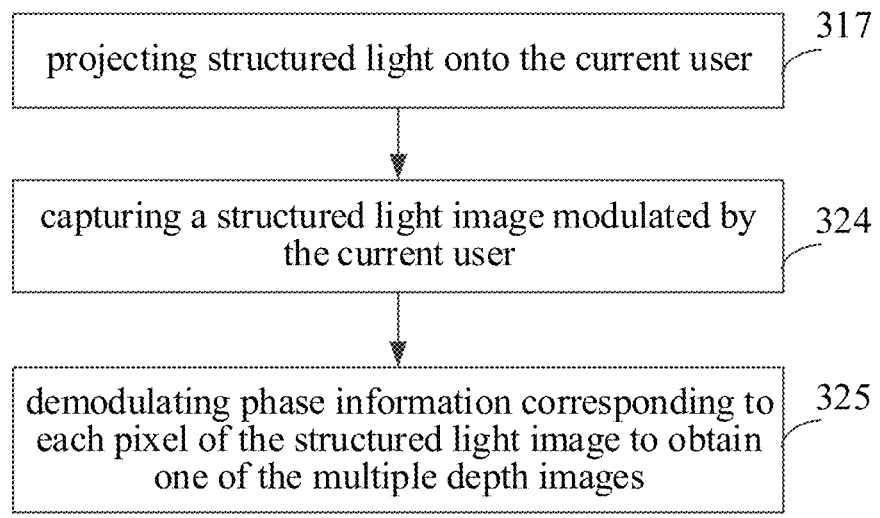
FIG. 9 is a schematic flowchart illustrating an image processing method according to embodiments of the present disclosure.

As illustrated in FIG. 9, in some implementations, the block 217 of acquiring the multiple depth images of the current user may include the following.

At block 317, structured light is projected to the current user.

At block 324, a structured light image modulated by the current user is captured.

At block 325, phase information corresponding to each pixel of the structured light image is demodulated to obtain one of the multiple depth images.

As illustrated in FIG. 2, in some implementations, the depth image collection component 12 may include the structured light projector 121 and the structured light camera 122. The block 201 may be implemented by the structured light projector 121, and the blocks 202 and 203 may be implemented by the structured light camera 122.

In other words, the structured light projector 121 may be configured to project the structured light to the current user. The structured light camera 122 may be configured to capture the structured light image modulated by the current user, and to demodulate the phase information corresponding to each pixel of the structured light image to obtain one of the multiple depth images.

In detail, after the structured light projector 121 projects the structured light of a certain pattern on the face and body of the current user, the structured light image modulated by the current user is formed on the surface of the face and body of the current user. The structured light camera 122 may be configured to capture the structured light image modulated and demodulate the structured light image to obtain the depth image. The pattern of the structured light may be laser stripes, Gray code, sinusoidal stripes, non-uniform speckles, and the like.

Figure 10:
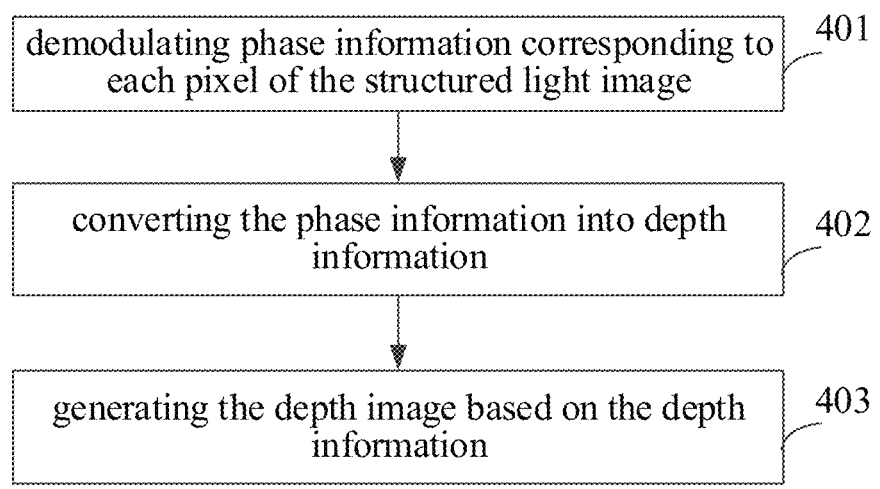
FIG. 10 is a schematic flowchart illustrating an image processing method according to embodiments of the present disclosure.

As illustrated in FIG. 10, in some implementations, the block 325 of demodulating the phase information corresponding to each pixel of the structured light image to obtain one of the multiple depth images may include the following.

At block 401, the phase information corresponding to each pixel of the structured light image is demodulated.

At block 402, the phase information is converted into depth information.

At block 403, the depth image is generated based on the depth information.

As illustrated in FIG. 2, in some implementations, the blocks 401, 402 and 403 may be implemented by the structured light camera 122.

In other words, the structured light camera 122 may be further configured to demodulate the phase information corresponding to each pixel of the structured light image, to convert the phase information into the depth information, and to generate the depth image based on the depth information.

In detail, compared to the structured light that is not modulated, the phase information of the modulated structured light changes. Therefore, the structured light presented in the structured light image is distorted. The changed phase information may characterize the depth information of objects. Consequently, the structured light camera 122 may obtain the phase information corresponding to each pixel in the structured light image through demodulation to calculate the depth information based on the phase information, so as to obtain the depth image.

In order to help those skilled in the art to clearly understand the process of capturing the depth image of the face and body of the current user based on structures, the following describes a specific principle of the process with a widely-used grating projection technology (stripe projection technology) as an example. The grating projection technology belongs to the structured surface light in a broad sense.

Figure 11A:
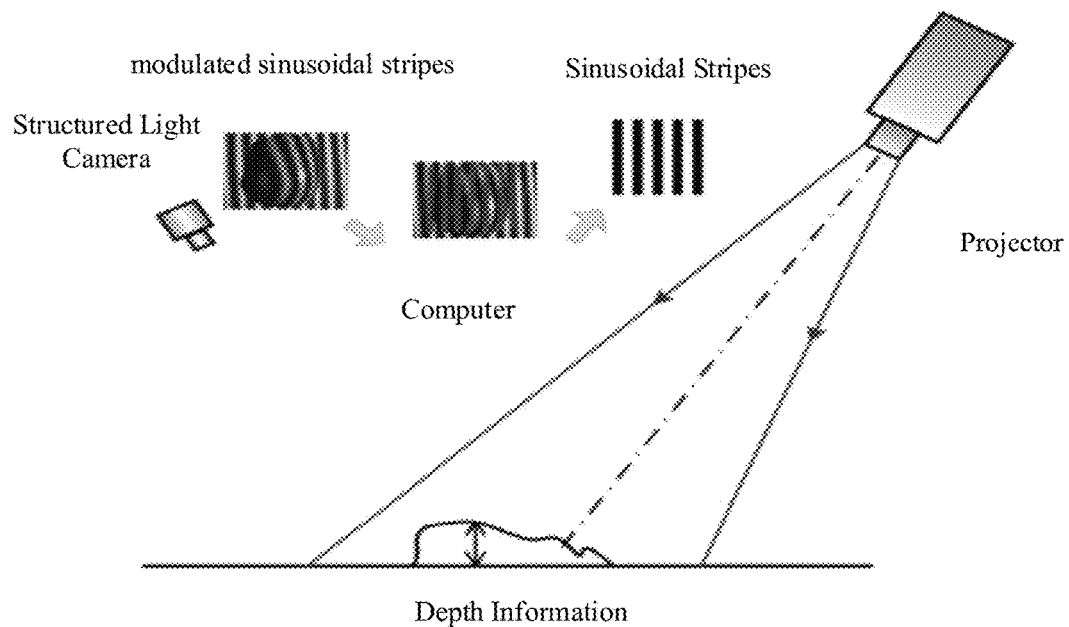
FIGS. 11A to 11E are schematic diagrams illustrating a measurement scenario of structured light according to embodiments of the present disclosure.

As illustrated in FIG. 11A, when using structured area light for projection, sinusoidal stripes may be generated by computer programs and projected onto an object to be measured through the structured light projector 121. A curvature degree of the stripes that is modulated by the object may be obtained by the structured light camera 122. The curved stripes may be demodulated to obtain the phase. The phase may be converted into the depth information to acquire the depth image. In order to avoid errors or error coupling, the depth image collection component 12 needs to be calibrated before obtaining the depth information based on the structured light. The calibration may include calibration of geometric parameters (for example, relative position parameters between the structured light camera 122 and the structured light projector 121), calibration of internal parameters of the structured light camera 122, calibration of internal parameters of the structured light projector 121, and the like.

Figure 11B:
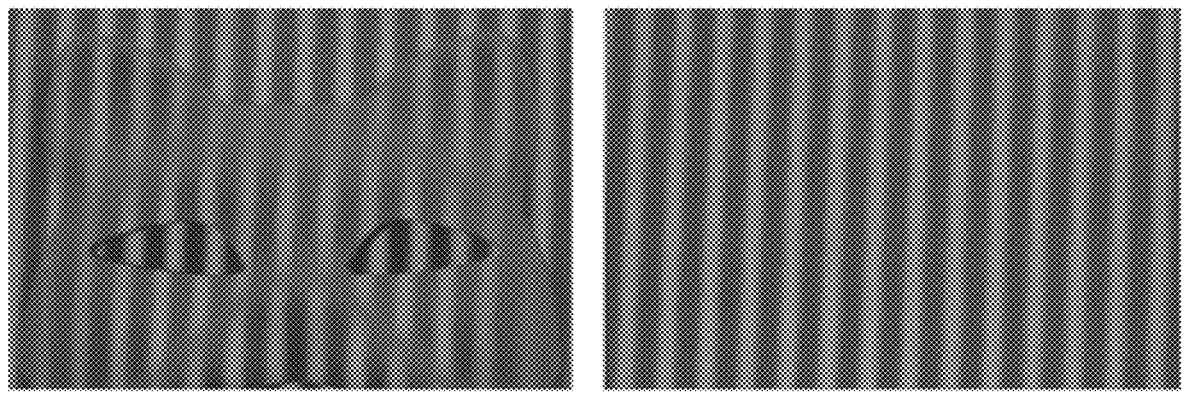

In detail, firstly, the sinusoidal stripes are produced by the computer programs. Since in subsequent operations, it is necessary to use the distorted stripes to obtain the phase, through for example a four-step phase shift method, four images of stripes having the phase difference of $$\frac{\pi}{2}$$

may be generated. The structured light projector 121 may project the four images of stripes onto the object to be measured (onto the mask as illustrated in FIG. 11A) in a time-sharing manner. The structured light camera 122 may capture the image illustrated on the left of FIG. 11B, and simultaneously the image of stripes on a reference surface as illustrated on the right of FIG. 11B are read.

Figure 11C:
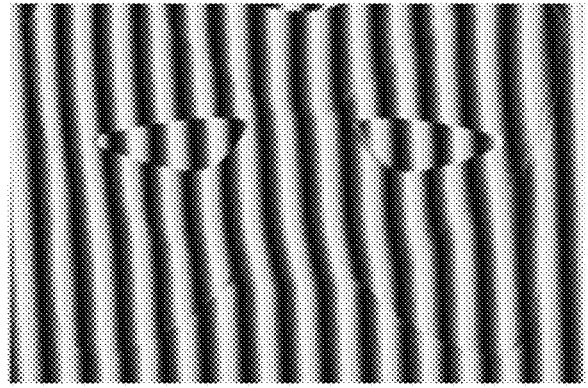
Figure 11C:
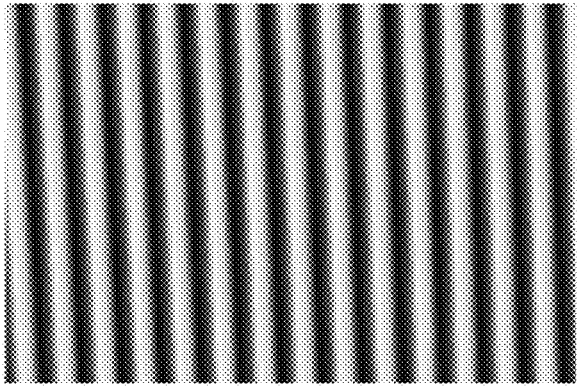

Secondly, a phase recovery is performed. The structured light camera 122 may be configured to calculate the modulated phase based on the four captured images of modulated stripes (i.e., structured light images). The phase image obtained here is a truncated phase image. This is because that the result of the four-step phase shift algorithm is calculated by an arctangent function such that the phase of the modulated structured light is limited in a range of $[-\pi, \pi]$. That is, whenever the modulated phase is outside the range of $[-\pi, \pi]$, the phase may be converted to this range by resetting the phase. Principle value of the resultant phase is illustrated in FIG. 11C.

Figure 11D:
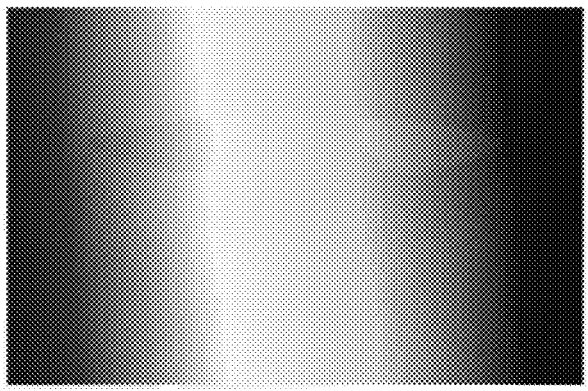
Figure 11D:
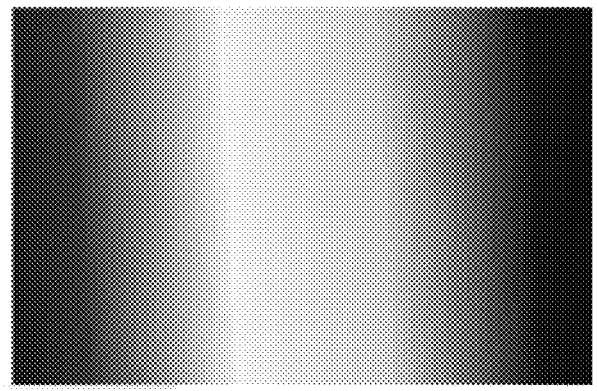

In the process of the phase recovery, de-jump processing is required, to convert the truncated phase into a continuous phase. As illustrated in FIG. 11D, the left image indicates a modulated continuous phase, and the right image indicates a reference continuous phase.

Figure 11E:
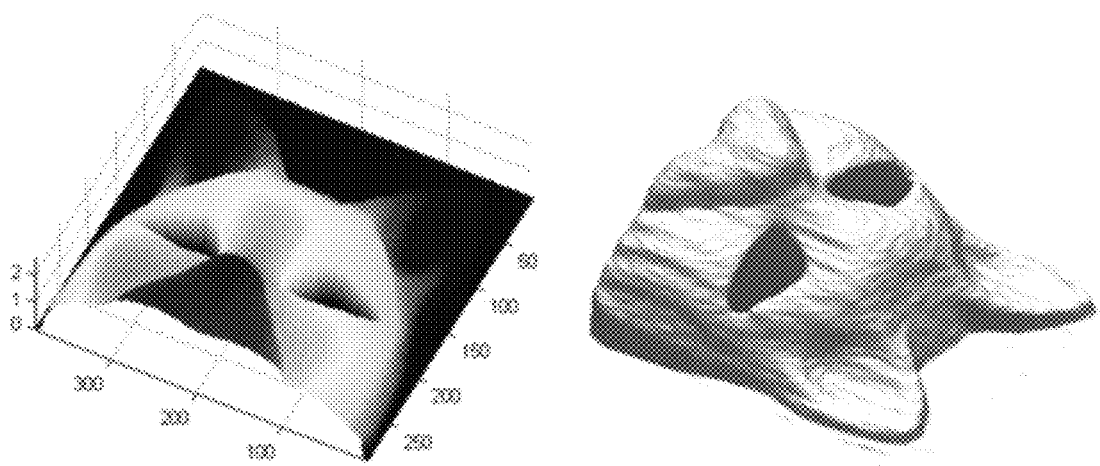

Thirdly, the modulated continuous phase is subtracted from the reference continuous phase to obtain the phase difference (i.e., the phase information). The phase difference represents the depth information of the object to be measured relative to a reference surface. The phase difference is substituted into a conversion formula (parameters involved in the formula are calibrated) between the phase and the depth to obtain a three-dimensional model of the object to be measured as illustrated in FIG. 11E.

It should be understood that, in an actual application, depending on the application scenario, the structured light used in embodiments of the present disclosure may have any other patterns besides the above grating pattern.

As a possible implementation, the present disclosure may also use structured speckle light to obtain the depth information of the current user.

Figure 12A:
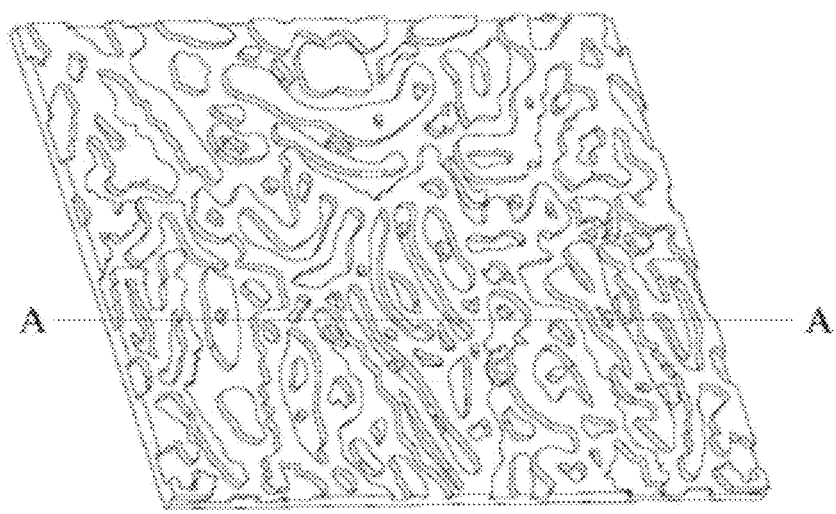
FIGS. 12A to 12B are schematic diagrams illustrating a measurement scenario of structured light according to embodiments of the present disclosure.
Figure 12B:
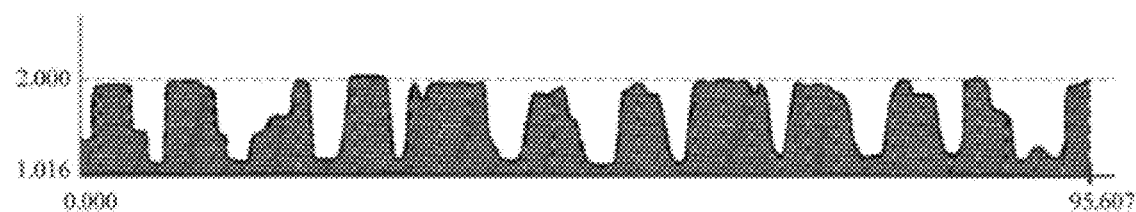

In detail, a method for obtaining the depth information with the structured speckle light is to use a substantially flat diffractive element. The substantially flat diffractive element is carved with a diffraction structure that has a specific phase distribution and a cross section of the substantially flat diffractive element has two or more concave-convex steps of carved structures. Thickness of a base of the diffractive element is approximately 1 micron, and heights of the steps are not equal to each other, which may range from 0.7 microns to 0.9 microns. FIG. 12A illustrates a partial diffraction structure of a collimating and beam splitting element according to embodiments. FIG. 12B illustrates a sectional view along a section A-A, and units of the abscissa and the ordinate are both micros. A speckle pattern generated by the structured speckle light has a high randomness, and the speckle pattern may change with distance. Therefore, before the depth information is obtained using the structured speckle light, it is required to calibrate the speckle patterns in space. For example, within a range of 0 to 4 meters away from the structured light camera 122, planes positioned every 1 cm from the structured light camera 122 may be taken as the reference planes such that 400 speckle images may be saved after the calibration. The shorter the distance of calibration, the higher the accuracy of the acquired depth information. Subsequently, the structured light projector 121 may project the structured speckle light onto the object to be measured (i.e., the current user). Height difference of the surface of the object to be measured may cause changes in the speckle pattern of the structured speckle light projected onto the object to be measured. After the structured light camera 122 captures the speckle pattern (i.e., the structured light image) projected onto the object to be measured, the structured light camera 122 may be configured to perform a cross-correlation operation on the speckle pattern and the 400 speckle images saved after the calibration, so as to obtain 400 relevance images. The position of the object to be measured in the space may cause a peak of the relevance image. The depth information of the object to be measured may be obtained by superimposing the above peaks and performing an interpolation operation.

Multiple beams of diffracted light may be obtained after the light is diffracted by an ordinary diffractive element. Intensities of the multiple beams of diffracted light are highly different, and a risk of harming the human eyes is high. Even if the diffracted light is diffracted again, uniformity of the light beam obtained is poor. Therefore, the projection effect of the light diffracted by the ordinary diffractive element onto the object to be measured is poor. In embodiments, the collimating and beam-splitting element may be used. This element not only has a function of light collimating on non-collimated light, but also has a function of light splitting. That is, multiple beams of collimated light may exit in different directions after the non-collimated light reflected by a mirror passes through the collimating and beam-splitting element. Cross-sectional areas of the multiple beams of collimated light may be approximately equal to each other, and energy fluxes may be approximately equal to each other, such that the projection effect of light speckles after the light diffraction is good. In this case, light from the laser is dispersed to the multiple light beams, thereby further reducing the risk of harming the human eyes. Compared to other structured light of uniform arrangement, the structured speckle light consumes less power while achieving the same collection effect.

Figure 13:
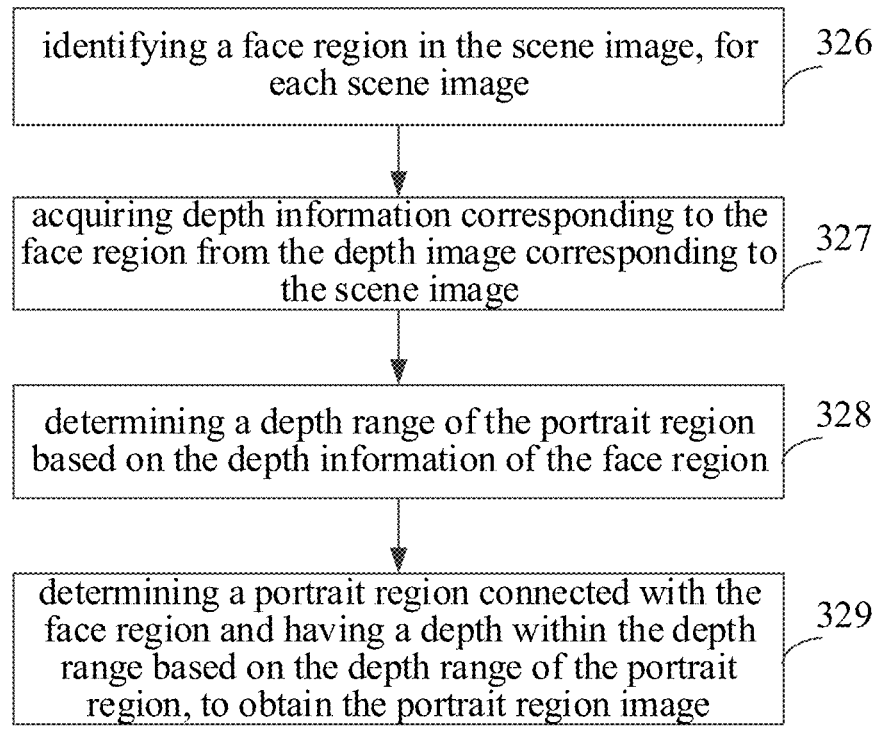
FIG. 13 is a schematic flowchart illustrating another image processing method according to embodiments of the present disclosure.

As illustrated in FIG. 13, in some implementations, the block of processing each scene image of the first scene video based on the multiple depth images, to acquire the portrait region of the current user in each scene image to obtain the portrait region image may include the following.

At block 326, the face region in the scene image is identified for each scene image.

At block 327, the depth information corresponding to the face region is acquired from the depth image corresponding to the scene image.

At block 328, the depth range of the portrait region is determined based on the depth information of the face region.

At block 329, the portrait region connected with the face region and having a depth within the depth range is determined based on the depth range of the portrait region, to obtain the portrait region image.

As illustrated in FIG. 2, in some implementations, the blocks 326, 327, 328 and 329 may be implemented by the processor 20.

In other words, the processor 20 may be further configured to identify the face region in the scene image, to acquire the depth information corresponding to the face region from the depth image, to determine the depth range of the portrait region based on the depth information of the face region, and to determine the portrait region connected with the face region and having a depth within the depth range based on the depth range of the portrait region, to obtain the portrait region image.

In detail, a trained deep learning model may be used to identify the face region in the scene image, and to determine the depth information of the face region based on a correspondence between the scene image and the depth image. Since the face region includes features such as nose, eyes, ears, lips, and the like, the depth data corresponding to features included in the face region are different in the depth image. For example, in a case that the face is facing the depth image collection component 12, in the depth image captured by the depth image collection component 12, the depth data corresponding to the nose may be relatively small, while the depth data corresponding to the ears may be relatively large. Therefore, the depth information of the face region may be a numerical value or a numerical range. In a case that the depth information of the face region is a numerical value, the numerical value may be obtained by averaging the depth data of the face region. In another example, the numerical value may be obtained by taking a median value of the depth data of the face region.

Since the portrait region includes the face region, i.e., depth of the portrait region and the face region are within a same depth range, the processor 20 may determine the depth information of the face region, set the depth range of the portrait region based on the depth information of the face region, and extract the portrait region having a depth within the depth range and connected with the face region based on the depth range of the portrait region, to obtain the portrait region image.

In this way, the portrait region image may be extracted from the scene image based on the depth information. Since acquisition of the depth information is insusceptible to factors such as luminance or the color temperature in the environment, the extracted portrait region image may be more accurate.

Figure 14:
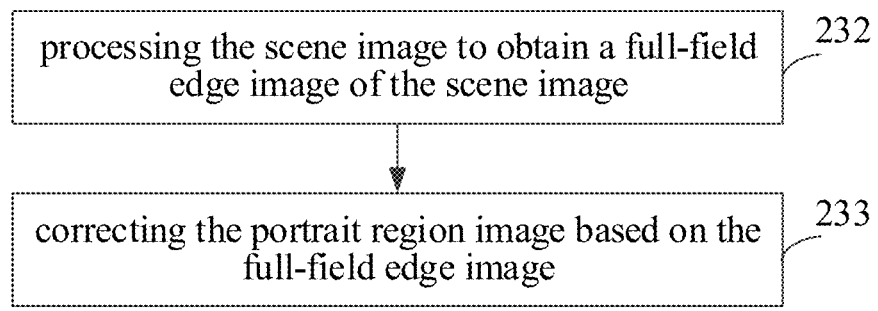
FIG. 14 is a schematic flowchart illustrating another image processing method according to embodiments of the present disclosure.

As illustrated in FIG. 14, in some implementations, the image processing method may further include the following.

At block 232, the scene image is processed to obtain a full-field edge image of the scene image.

At block 233, the portrait region image is corrected based on the full-field edge image.

As illustrated in FIG. 2, in some implementations, the blocks 232 and 233 may be implemented by the processor 20.

In other words, the processor 20 may be further configured to process the scene image to obtain the full-field edge image of the scene image, and to correct the portrait region image based on the full-field edge image.

The processor 20 may be configured to perform edge extraction on the scene image to obtain the full-field edge image. Edges of the full-field edge image may include edges of the current user and edges of background objects in the scene where the current user is located. In detail, the edge extraction may be performed on the scene image by a Canny operator. The core of the edge extraction algorithm of the Canny operator mainly includes the followings. A 2D Gaussian filter template may be used to perform convolution operation on the scene image to eliminate noise. A differential operator may be used to obtain a gradient value of the gray value of each pixel, a gradient direction of the gray value of each pixel may be calculated based on the gradient value, and adjacent pixels along the gradient direction may be found based on the gradient direction. Each pixel is traversed. If the gray value of a pixel is less than gray values of two adjacent pixels along the gradient direction, it may be considered that the pixel is not an edge point. In this way, pixels at edges of the scene image may be determined, so as to obtain the full-field edge image after the edge extraction.

After obtaining the full-field edge image, the processor 20 may be further configured to correct the portrait region image based on the full-field edge image. It may be understood that the portrait region image is obtained by including all pixels in the scene image that are connected with the face region and having depth within the set depth range. In some scenes, there may be some objects that are connected with the face region and having depth within the depth range. Therefore, in order to make the extracted portrait region image more accurate, the full-field edge image may be used to correct the portrait region image.

Further, the processor 20 may be configured to correct the corrected portrait region image again. For example, the processor 20 may perform expansion processing on the corrected portrait region image to expand the portrait region image, thereby retaining edge details of the portrait region image.

After obtaining the portrait region image, the processor 20 may merge the portrait region image and the background image to obtain the merged image. In some implementations, the background image may be randomly selected by the processor 20 or selected by the current user. The merged image may be displayed on the display screen of the electronic device 1000, or may be printed by the printer connected to the electronic device 1000.

Since the current user is in the video chat with the another, the visible light camera 11 needs to capture the scene image of the current user in real time, the depth image collection component 12 needs to capture the depth image corresponding to the current user in real time, and the processor 20 needs to timely process the scene image and the depth image captured in real time to enable the another to view a smooth video composed of different merged images.

In a case that the color temperature of the scene does not match the color temperature of the background image to be merged, one or both of the color temperatures may be adjusted. In some implementations, a fill light may be provided to the scene based on the color temperature of the scene to illuminate the scene for adjusting or changing of the color temperature of the scene, such that the color temperature of the scene matches the color temperature of the background image.

Figure 15:
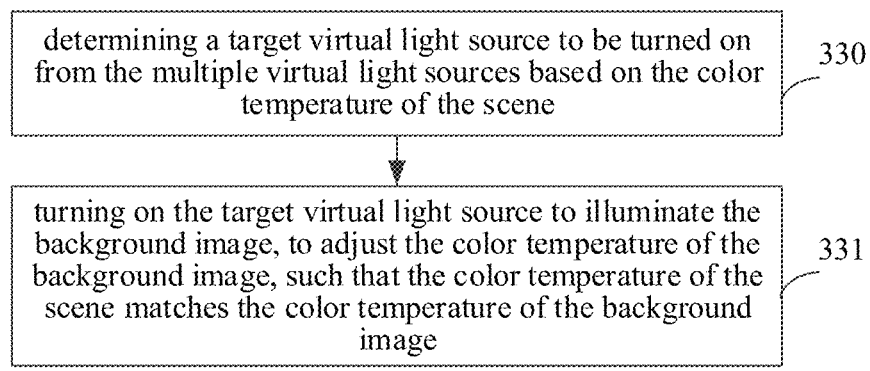
FIG. 15 is a schematic flowchart illustrating another image processing method according to embodiments of the present disclosure.

As illustrated in FIG. 15, in some implementations, the block 220 of turning on the virtual light source matching the color temperature of the scene to adjust the color temperature of the background image to be merged, such that the color temperature of the scene matches the color temperature of the background image may include the following.

At block 330, a target virtual light source to be turned on is determined from multiple virtual light sources based on the color temperature of the scene.

In some implementations, the multiple virtual light sources may be set for each background image in advance. Each virtual light source has a respective color temperature. An identifier is set for each color temperature, such that a corresponding may be established between the color temperature and the virtual light source and stored in the processor 20 in advance. After the color temperature of the scene is obtained, the processor may query the corresponding based on the identifier of the color temperature of the scene to determine the virtual light source matching the color temperature, take the virtual light source determined as the target virtual light source to be turned on.

At block 331, the target virtual light source is turned on to illuminate the background image, to adjust the color temperature of the background image, such that the color temperature of the scene matches the color temperature of the background image.

After the target virtual light source is determined, the processor 20 may be configured to turn on the target virtual light source for emitting light. After the light reaches the background image, the color temperature of the background image changes due to the light, such that the color temperature of the background image matches the color temperature of the scene.

In some implementations, before the virtual light source that matches the color temperature of the scene is turned on, the processor 20 may be further configured to determine whether the color temperature of the scene matches the color temperature of the background image. In detail, after the color temperature of the scene and the color temperature of the background image are obtained, the color temperature of the scene is compared with the color temperature of the background image to be merged to obtain a difference between the two color temperatures. In a case that the difference exceeds a preset color temperature threshold, it is indicated that the color temperature of the scene does not match the color temperature of the background image, and thus the color temperature of the background image may be adjusted.

Figure 16:
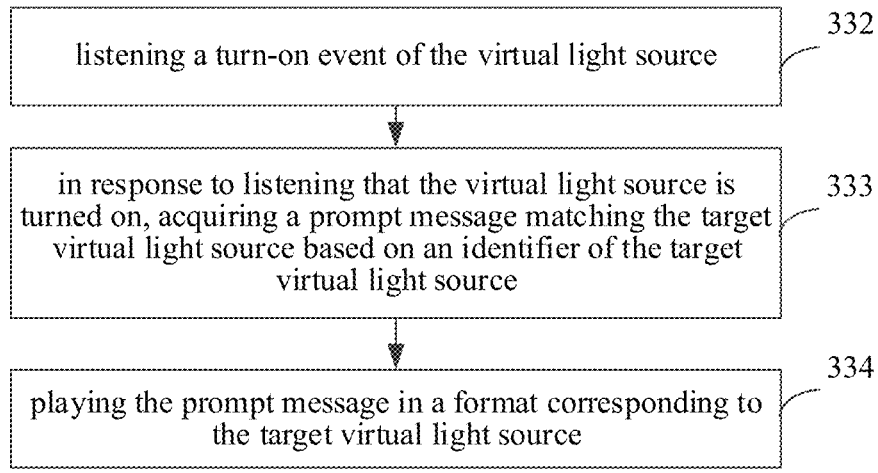
FIG. 16 is a schematic flowchart illustrating another image processing method according to embodiments of the present disclosure.

As illustrated in FIG. 16, in some implementations, the block 221 of playing the prompt message upon turning on the virtual light source may include the following.

At block 332, a turn-on event of the virtual light source is listened.

In embodiments of the present disclosure, a turning-on event of the virtual light source may be set as a turn-on event in advance, and the turn-on event may be stored in the processor 20. The processor 20 may listen to the turn-on event. When the virtual light source is turned on, i.e., the turn-on event occurs, the processor 20 may listen to the turn-on event.

At block 333, in response to listening that the virtual light source is turned on, the prompt message matching the target virtual light source is acquired based on an identifier of the target virtual light source.

In embodiments of the present disclosure, different virtual light sources may correspond to different types of prompt messages. An association relationship between the virtual light source and the prompt message may be established and stored in the processor 20. The processor 20 may query the above-mentioned association relationship based on the identifier of the target virtual light source to be turned on to acquire the prompt message that matches the target virtual light source. The prompt message may include sound, vibration, ring and so on.

At block 334, the prompt message is played in a format corresponding to the target virtual light source.

Different virtual light sources may correspond to different prompting formats. For example, in a case that the prompt message is a sound, different volumes and/or prompting duration may be set. After the prompt message is determined, the processor 20 may play the prompt message in the format corresponding to the target virtual light source.

With the image processing method according to embodiments of the present disclosure, by playing the prompt message upon turning on the virtual light source, a vocal merging scene may be constructed, thereby raising interesting, enabling the user to know occurrence of the merging and improving user experience.

In some implementations, before the virtual light source that matches the color temperature of the scene is turned on, the processor 20 may further determine whether the color temperature of the scene matches the color temperature of the background image. In detail, after the color temperature of the scene and the color temperature of the background image are obtained, the color temperature of the scene is compared with the color temperature of the background image to be merged to acquire the difference between the two color temperatures. In a case that the difference exceeds the preset color temperature threshold, it is indicated that the color temperature of the scene does not match the color temperature of the background image. Consequently, both the color temperature of the scene and the color temperature of the background image may be adjusted, such that that the color temperature of the scene matches the color temperature of the background image.

Figure 17:
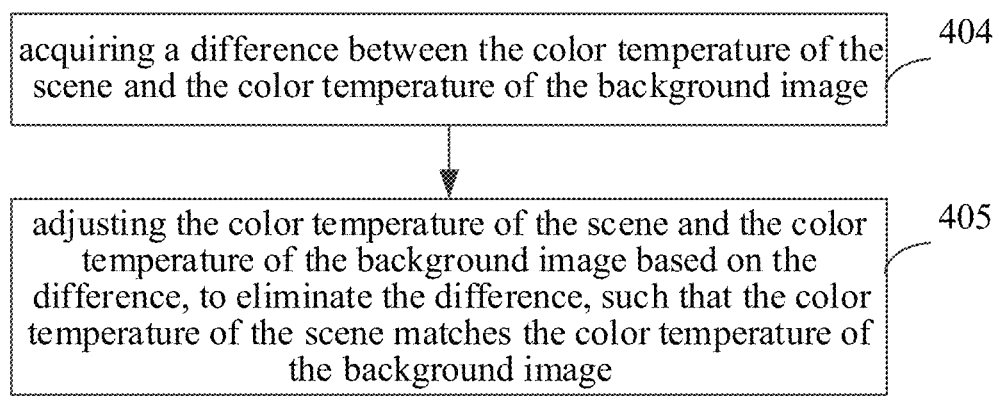
FIG. 17 is a schematic flowchart illustrating another image processing method according to embodiments of the present disclosure.

As illustrated in FIG. 17, adjusting both the color temperature of the scene and the color temperature of the background image, such that that the color temperature of the scene matches the color temperature of the background image may include the following.

At block 404, the difference between the color temperature of the scene and the color temperature of the background image is acquired.

At block 405, the color temperature of the scene and the color temperature of the background image are adjusted based on the difference, to eliminate the difference between the color temperature of the scene and the color temperature of the background image, such that the color temperature of the scene matches the color temperature of the background image.

In detail, the processor 200 may compare the color temperature of the scene and the color temperature of the background image, to reduce the color temperature of the adjustment object with a larger value based on the difference. For example, the larger vale may be reduced by half from the current value to obtain the color temperature of the adjustment object. Further, the color temperature of the adjustment object with a lower value may be raised based on the difference. For example, the lower value may be raised by half from the current value to obtain the color temperature of the adjustment object.

For example, in a case that the color temperature of the scene is higher than the color temperature of the background image by 2,000K, the processor 20 may reduce the color temperature of the scene by 1,000K and raise the color temperature of the background image by 1,000K.

In embodiments, since the difference between the color temperature of the scene and the color temperature of the background image is taken into account during the adjustment process, a target color temperature may be closed to the color temperature of the scene, and color characteristics of the original color temperature of the background image may be maintained, such that sharp changes may not occur to the background image. Consequently, after the portrait region image of the current user is merged with the background image, the merging effect may be better and more natural, thereby satisfying user's demands.

Figure 18:
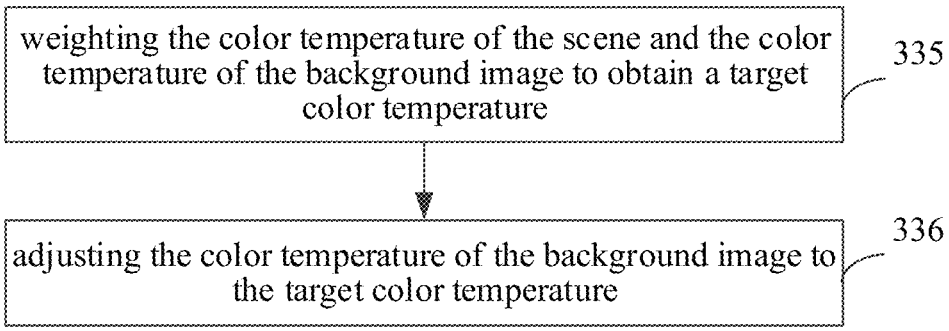
FIG. 18 is a schematic flowchart illustrating another image processing method according to embodiments of the present disclosure.

As illustrated in FIG. 18, in some implementations, the block 22 of adjusting the color temperature of the background image to be merged based on the color temperature of the scene, such that the color temperature of the scene matches the color temperature of the background image may include the following.

At block 335, the color temperature of the scene and the color temperature of the background image are weighted to obtain the target color temperature.

Weights for weighting color temperatures may be set for the scene and the background image in advance, and the weights may be stored in the processor 20. After acquiring the color temperature of the scene and the color temperature of the background image, the processor 20 may obtain the weight corresponding to the scene and the weight corresponding to the background image respectively. The color temperature of the scene may be multiplied by the weight of the scene to obtain a first value. The color temperature of the background image may be multiplied by the weight of the background image to obtain a second value. The first value and the second value may be added to obtain a color temperature, i.e., the target color temperature.

At block 336, the color temperature of the background image is adjusted to the target color temperature.

After the target color temperature is obtained, the color temperature of the background image may be directly adjusted to the target color temperature. Since the difference between the color temperature of the scene and the color temperature of the background image is taken into account during the weighting process, the target color temperature may be closed to the color temperature of the scene, and color characteristics of the original color temperature of the background image are maintained, such that sharp changes may not occur to the background image. Consequently, after the portrait region image of the current user is merged with the background image, the merging effect may be better and more natural, thereby satisfying user's demands.

As a possible implementation, the color temperature of the scene may be directly used as the target color temperature, and the color temperature of the background image to be merged may be replaced with the target color temperature, such that the color temperature of the background image is completely consistent with the color temperature of the scene. After the portrait region image of the current user is merged with the background image, the merging effect may be more natural, thereby avoiding a technical problem that the merging effect is unnatural on vision of the user.

Figure 19:
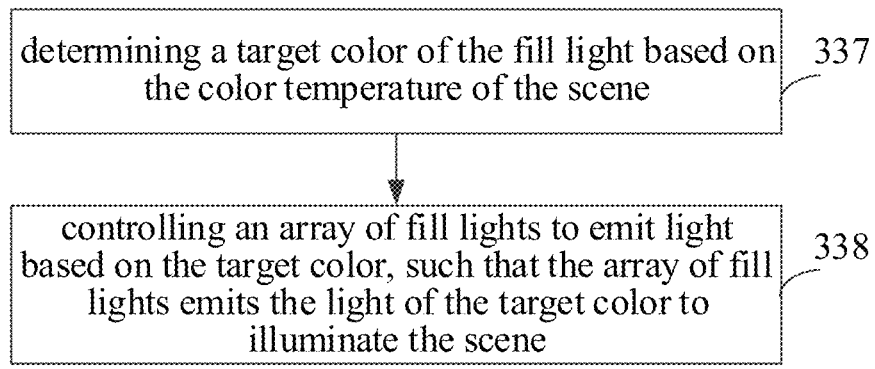
FIG. 19 is a schematic flowchart illustrating another image processing method according to embodiments of the present disclosure.

As illustrated in FIG. 19, in some implementations, the block 233 of providing the fill light to the scene of the current user based on the color temperature of the scene, such that the color temperature of the scene matches the color temperature of the background image to be merged may include the following.

At block 337, a target color of the fill light is determined based on the color temperature of the scene.

At block 338, an array of fill lights is controlled to emit light based on the target color, such that the array of fill lights emits the light of the target color to illuminate the scene.

As illustrated in FIG. 2, in some implementations, the blocks 337 and 338 may be implemented by the processor 20.

After the color temperature of the scene is obtained, the processor 20 may further obtain the color temperature of the background image to be merged. In order to enable the color temperature of the scene to match the color temperature of the background image, the processor 20 may determine the target color of the fill lights based on the color temperature of the scene and the color temperature of the background image. After the target color is determined, the fill light of the target color may be provided for the scene.

In embodiments of the present disclosure, the array of fill lights may be further provided in the image processing apparatus 1000, and the scene may be illuminated by the array of fill lights. In detail, the processor 20 may control the array of fill lights to emit the light of the target color based on the target color. In some implementations, the array of fill lights is an array composed of multiple fill lights. Multiple lighting strategies may be preset for the array of fill lights. The lighting strategies may be used for lights that may emit light of different colors. The lighting strategy may include on-off states of respective fill lights. The processor 20 may have the lighting strategies stored therein. After the target color is determined, the processor 20 may match the stored lighting strategies based on the target color to obtain the lighting strategy corresponding to the target color. The on-off state of each fill light may be controlled based on the lighting strategy, such that the array of fill lights may emit the light of the target color to illuminate the scene and to change the color temperature of the scene, such that the color temperature of the scene matches the color temperature of the background image.

In some implementations, before the fill light is provided to illuminate the scene based on the color temperature of the scene, the processor 20 may determine whether the color temperature of the scene matches the color temperature of the background image. In detail, after the color temperature of the scene and the color temperature of the background image are acquired, the color temperature of the scene may be compared with the color temperature of the background image to be merged to obtain the difference between the two color temperatures. In a case that the difference exceeds the preset color temperature threshold, it is indicated that the color temperature of the scene does not match the color temperature of the background image, and thus the color temperature of the scene needs to be adjusted.

Figure 20:
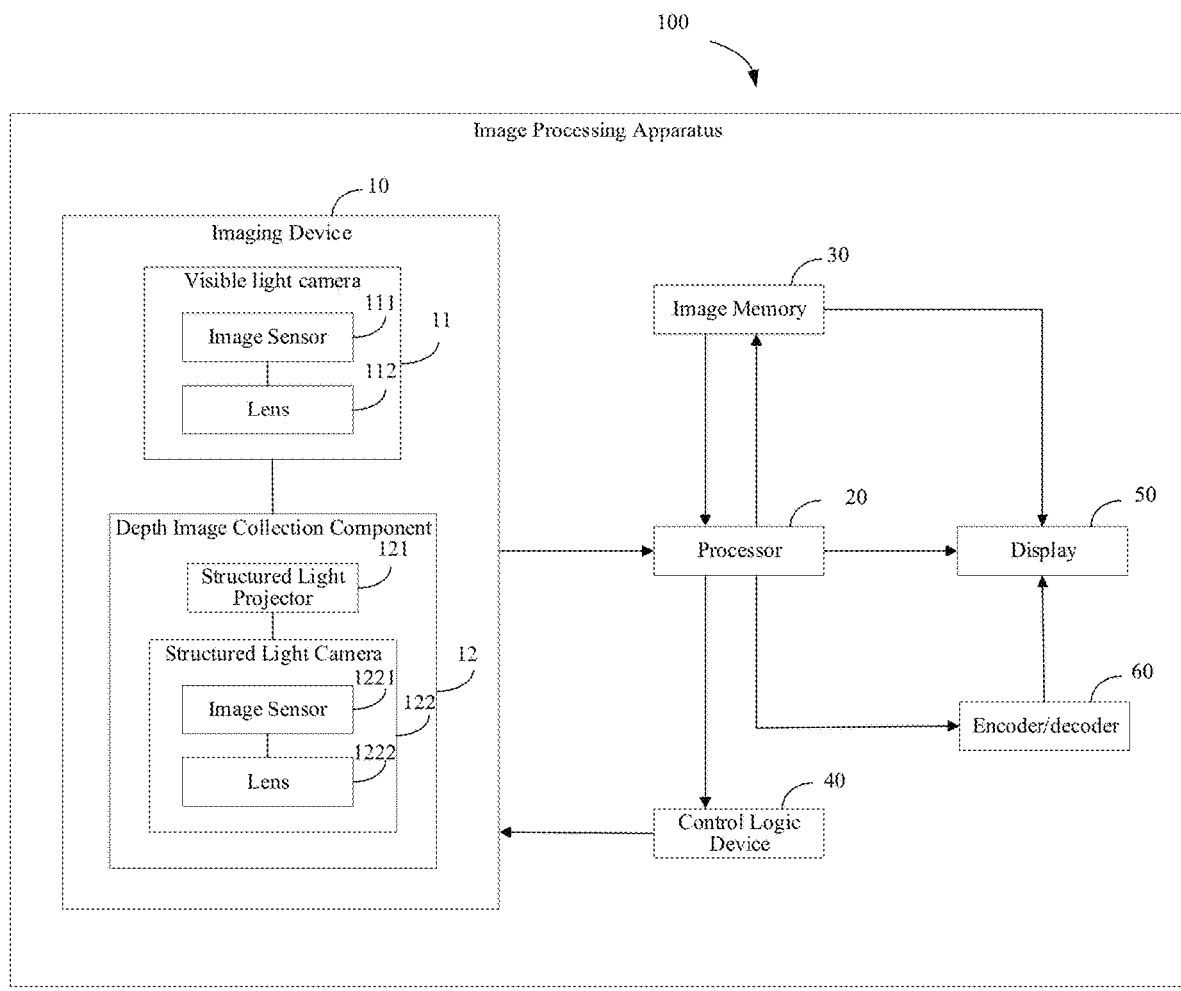
FIG. 20 is a schematic block diagram illustrating an image processing apparatus according to embodiments of the present disclosure.

As illustrated in FIG. 3 and FIG. 20, implementations of the present disclosure further provide an electronic device 1000. The electronic device 1000 may include the image processing apparatus 100. The image processing apparatus 100 may be implemented by hardware and/or software. The image processing apparatus 100 may include an imaging device 10 and the processor 20.

The imaging device 10 may include a visible light camera 11 and a depth image collection component 12.

In detail, the visible light camera 11 may include an image sensor 111 and a lens 112. The visible light camera 11 may be configured to capture color information of the current user to obtain the scene image of the scene. The image sensor 111 may include a color filter array (such as a Bayer filter array) and there may be one or more lenses 112. During the process of capturing the scene image by the visible light camera 11, each imaging pixel in the image sensor 111 may sense light intensity and wavelength information from the scene to be captured to generate a set of original image data. The image sensor 111 may send the set of original image data to the processor 20, and the processor 20 may obtain a color scene image after performing operations such as denoising and interpolation on the original image data. The processor 20 may process image pixels in the original image data one by one in various formats. For example, each image pixel may have a bit depth of 8, 10, 12 or 14 bits, and the processor 20 may process each image pixel based on the same or different bit depths.

The depth image collection component 12 may include a structured light projector 121 and a structured light camera 122. The depth image collection component 12 may be configured to capture depth information of the current user to obtain a depth image. The structured light projector 121 may be configured to project structured light onto the current user. The pattern of the structured light may be laser stripes, Gray code, sinusoidal stripes, or a randomly arranged speckle pattern. The structured light camera 122 may include an image sensor 1221 and a lens 1222. There may be one or more lenses 1222. The image sensor 1221 may be configured to capture a structured light image generated by projecting by the structured light projector 121 onto the current user. The structured light image may be sent by the depth collection component 12 to the processor 20 for processing such as demodulation, phase recovery and phase information calculation to obtain the depth information of the current user.

In some implementations, functions of the visible light camera 11 and the structured light camera 122 may be implemented by a single camera. That is, the imaging device 10 may include a single camera and a single structured light projector 121. The above camera may be configured to capture a scene image, as well as a structured light image.

In addition to using the structured light to obtain the depth image, it is also possible to obtain depth image of the current user through a depth image acquisition method such as a binocular vision method, a depth image acquisition method based on time of flight (TOF) and so on.

The processor 20 may be further configured to merge the portrait region image and the background image to obtain the merged image. When extracting the portrait region image, the processor 20 may be configured to extract a two-dimensional portrait region image from the scene image in combination with the depth information of the depth image, or the processor 20 may be configured to establish a three-dimensional image of the portrait region based on the depth information of the depth image, and perform color filling on the three-dimensional portrait region in combination with the color information of the scene image to obtain a three-dimensional color portrait region image. Consequently, merging and processing the portrait region image and the background image may refer to that the two-dimensional portrait region image and the background image may be merged to obtain the merged image, or the three-dimensional color portrait region image and the background image may be merged to obtain the merged image.

The image processing apparatus 100 may further include an image memory 30. The image memory 30 may be embedded in the electronic device 1000, or may be a memory independent from the electronic device 1000. The image memory 130 may include a feature of direct memory access (DMA). Raw image data collected by the visible light camera 11 or relevant data of the structured light image collected by the depth image collection component 12 may be transferred to the image memory 30 for storing or buffering. The processor 20 may read the raw image data from the image memory 30 for processing to obtain the scene image, and may also read the relevant data of the structured light image from the image memory 30 for processing to obtain the depth image. In addition, the scene image and the depth image may also be stored in the image memory 30 such that the processor 20 may call them for processing at any time. For example, the processor 20 is configured to call the scene image and the depth image to extract the portrait region, and merge the extracted portrait region image and the background image to obtain the merged image. The background image and the merged image may also be stored in the image memory 30.

The image processing apparatus 100 may further include a display 50. The display 50 may directly acquire the merged image from the processor 20 or acquire the merged image from the image memory 30. The display 50 may be configured to display the merged image for viewing by the user, or for processing by a graphics engine or a graphics processing unit (GPU). The image processing apparatus 100 ay further include an encoder/decoder 60. The encoder/decoder 60 may be configured to encode and decode image data of the scene image, the depth image and the merged image. The encoded image data may be stored in the image memory 30, and may be decompressed by the decoder and may be displayed on the display 50 after the decompression. The encoder/decoder 60 may be implemented by a central processing unit (CPU), a GPU or a coprocessor. In other words, the encoder/decoder 60 may be one or more of the CPU, the GPU and the coprocessor.

The image processing apparatus 100 further may include a control logic device 40. When the imaging device 10 is capturing an image, the processor 20 may be configured to analyze data obtained by the imaging device to determine statistical image information of one or more control parameters (for example, exposure time) of the imaging device 10. The processor 20 may send the statistical image information to the control logic device 40, and the control logic device 40 may control the imaging device 10 to capture an image based on determined control parameters. The control logic device 40 may include a processor and/or a microcontroller for executing one or more routines, such as firmware. The one or more routines may determine the control parameters of the imaging device 10 based on the received statistical image information.

Figure 21:
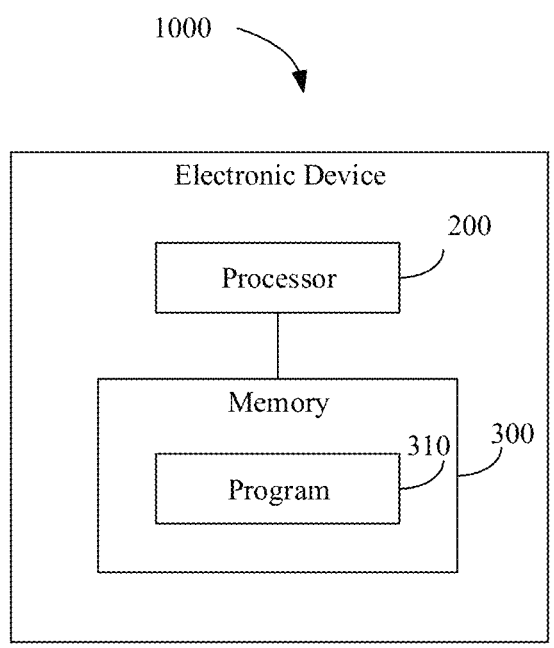
FIG. 21 is a schematic block diagram illustrating an electronic device according to embodiments of the present disclosure.

As illustrated in FIG. 21, the electronic device 1000 according to implementations of the present disclosure may include one or more processors 200, a memory 300 and one or more programs 310. The one or more programs 310 are stored in the memory 300 and configured to be executed by the one or more processors 200. The one or more programs 310 include instructions for executing the image processing method according to any one of the implementations.

For example, the one or more programs 310 may include instructions for performing the image processing method described as follows.

At block 101, a background image and a portrait region image of the current user that the preset parameter of the background image matches the preset parameter of the portrait region image are acquired.

At block 102, the portrait region image and the background image are merged to obtain a merged image.

The computer readable storage medium according to implementations of the present disclosure may include a computer program used in combination with the electronic device 1000 capable of capturing an image. The computer program may be executed by the processor 200 to execute the image processing method according to any one of the above implementations.

For example, the computer program may be executed by the processor 200 to implement the image processing method described as follows.

At block 101, the background image and the portrait region image of the current user that the preset parameter of the background image matches the preset parameter of the portrait region image are acquired.

At block 102, the portrait region image and the background image are merged to obtain the merged image.

In the description, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description, are not intended to indicate or imply relative importance or significance, or imply the amount of this feature. Thus, the feature defined with "first" and "second" may comprise at least one this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, for example including another order or sequence different from the illustrated order or discussed order, or including a substantially simultaneous order or an inverse order of functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (a non-exhaustive list) of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above implementations, the multiple steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method of image processing, applicable to an electronic device, and the method comprising:
   acquiring a background image and a portrait region image of a current user, a preset parameter of the background image matching the preset parameter of the portrait region image; and
   merging the portrait region image and the background image to obtain a merged image;
   wherein the preset parameter comprises a color temperature, acquiring the background image and the portrait region image of the current user comprises:
   detecting a color temperature of a scene where the current user is located;
   adjusting an object to be merged based on the color temperature of the scene such that the color temperature of the object to be merged matches the color temperature of the scene; wherein the object to be merged is the background image and/or the portrait region image of the current user; or
   turning on a virtual light source matching the color temperature of the scene to adjust the color temperature of the background image to be merged, such that the color temperature of the scene matches the color temperature of the background image; or
   adjusting the color temperature of the background image to be merged using the color temperature of the scene, such that the color temperature of the scene matches the color temperature of the background image; or
   providing a fill light to the scene based on the color temperature of the scene, such that the color temperature of the scene matches the color temperature of the background image to be merged;
   acquiring a first scene video of the current user;
   acquiring a plurality of depth images of the current user; and
   processing each scene image of the first scene video based on the plurality of depth images, to acquire a portrait region of the current user in each scene image to obtain the portrait region image; and
   merging the portrait region image and the background image to obtain the merged image comprises: merging each portrait region image and a corresponding background image to obtain the merged image.

2. The method of claim 1, wherein adjusting the object to be merged based on the color temperature of the scene such that the color temperature of the object to be merged matches the color temperature of the scene comprises:
   in response to detecting that the color temperature of the scene does not match the color temperature of the background image, providing a fill light to the scene based on the color temperature of the scene, to adjust the color temperature of the scene such that the color temperature of the scene matches the color temperature of the background image; or
   in response to detecting that the color temperature of the scene does not match the color temperature of the background image, adjusting the background image based on the color temperature of the scene, such that the color temperature of the scene matches the color temperature of the background image; or
   in response to detecting that the color temperature of the scene does not match the color temperature of the background image, adjusting both the color temperature of the scene and the color temperature of the background image based on the color temperature of the scene, such that the color temperature of the scene matches the color temperature of the background image.

3. The method of claim 2, wherein adjusting both the color temperature of the scene and the color temperature of the background image based on the color temperature of the scene comprises:
   acquiring a difference between the color temperature of the scene and the color temperature of the background image; and
   adjusting the color temperature of the scene and the color temperature of the background image based on the difference, to eliminate the difference between the color temperature of the scene and the color temperature of the background image, such that the color temperature of the scene matches the color temperature of the background image.

4. The method of claim 1, wherein turning on the virtual light source matching the color temperature of the scene to adjust the color temperature of the background image to be merged, such that the color temperature of the scene matches the color temperature of the background image comprises:
   determining a target virtual light source to be turned on from a plurality of virtual light sources based on the color temperature of the scene; and
   turning on the target virtual light source to illuminate the background image, to adjust the color temperature of the background image, such that the color temperature of the scene matches the color temperature of the background image.

5. The method of claim 4, wherein determining the target virtual light source to be turned on from the plurality of virtual light sources based on the color temperature of the scene comprises:
   querying a preset correspondence between the color temperature of the scene and the virtual light source based on an identifier of the color temperature of the scene, and acquiring the virtual light source consistent with the identifier as the target virtual light source.

6. The method of claim 1, further comprising:
   listening a turn-on event of the virtual light source;
   in response to listening that the virtual light source is turned on, acquiring a prompt message matching a target virtual light source based on an identifier of the target virtual light source; and
   playing the prompt message in a format corresponding to the target virtual light source.

7. The method of claim 1, wherein adjusting the color temperature of the background image to be merged using the color temperature of the scene, such that the color temperature of the scene matches the color temperature of the background image comprises:
   adjusting the color temperature of the background image to the color temperature of the scene; or
   weighting the color temperature of the scene and the color temperature of the background image to obtain a target color temperature; and
   adjusting the color temperature of the background image to the target color temperature.

8. The method of claim 1, before turning on the virtual light source matching the color temperature of the scene, or adjusting the color temperature of the background image to be merged using the color temperature of the scene, or before providing the fill light to the scene based on the color temperature of the scene, further comprising:

comparing the color temperature of the scene with the color temperature of the background image, to obtain a difference between the color temperature of the scene and the color temperature of the background image and to determine that the difference is greater than a preset color temperature threshold.

9. The method of claim 1, wherein providing the fill light to the scene based on the color temperature of the scene, such that the color temperature of the scene matches the color temperature of the background image to be merged comprises:

determining a target color of the fill light based on the color temperature of the scene and the color temperature of the background image to be merged; and controlling an array of fill lights to emit light of the target color based on the target color to illuminate the scene.

10. The method of claim 9, wherein controlling the array of fill lights to emit the light of the target color based on the target color comprises:

querying and acquiring a lighting strategy of the array of fill lights corresponding to the target color based on the target color; and determining an on/off state of each fill light in the array of fill lights based on the lighting strategy, such that the array of fill lights emits the light of the target color.

11. The method of claim 1, wherein acquiring the plurality of depth images of the current user comprises:

projecting structured light to the current user;

capturing a structured light image modulated by the current user; and demodulating phase information corresponding to each pixel of the structured light image to obtain one of the plurality of depth images.

12. The method of claim 1, wherein processing each scene image of the first scene video based on the plurality of depth images, to acquire the portrait region of the current user in each scene image to obtain the portrait region image comprises:

identifying a face region in the scene image for each scene image;

acquiring depth information corresponding to the face region from the depth image;

determining a depth range of the portrait region based on the depth information of the face region; and determining the portrait region connected with the face region and having a depth within the depth range based on the depth range of the portrait region, to obtain the portrait region image.

13. An apparatus for image processing, integrated in an electronic device, and the apparatus comprising:

a visible light camera;

a depth image collection component, wherein the visible light camera and the depth image collection component are configured to acquire a background image and a portrait region image of a current user, a preset parameter of the background image matching the preset parameter of the portrait region image; and a processor, configured to:

merge the portrait region image and the background image to obtain a merged image;

wherein the preset parameter comprises a color temperature, and the visible light camera and the depth image collection component are configured to acquire the background image and the portrait region image of the current user by:

detecting a color temperature of a scene where the current user is located;

adjusting an object to be merged based on the color temperature of the scene such that the color temperature of the object to be merged matches the color temperature of the scene; wherein the object to be merged is the background image and/or the portrait region image of the current user; or turning on a virtual light source matching the color temperature of the scene to adjust the color temperature of the background image to be merged, such that the color temperature of the scene matches the color temperature of the background image; or adjusting the color temperature of the background image to be merged using the color temperature of the scene, such that the color temperature of the scene matches the color temperature of the background image; or providing a fill light to the scene based on the color temperature of the scene, such that the color temperature of the scene matches the color temperature of the background image to be merged;

acquiring a first scene video of the current user;

acquiring a plurality of depth images of the current user; and processing each scene image of the first scene video based on the plurality of depth images, to acquire a portrait region of the current user in each scene image to obtain the portrait region image; and merging the portrait region image and the background image to obtain the merged image comprises: merging each portrait region image and a corresponding background image to obtain the merged image.

14. The apparatus of claim 13, wherein adjusting the object to be merged based on the color temperature of the scene such that the color temperature of the object to be merged matches the color temperature of the scene comprises:

in response to detecting that the color temperature of the scene does not match the color temperature of the background image, providing a fill light to the scene based on the color temperature of the scene, to adjust the color temperature of the scene such that the color temperature of the scene matches the color temperature of the background image; or in response to detecting that the color temperature of the scene does not match the color temperature of the background image, adjusting the background image based on the color temperature of the scene, such that the color temperature of the scene matches the color temperature of the background image; or in response to detecting that the color temperature of the scene does not match the color temperature of the background image, adjusting both the color temperature of the scene and the color temperature of the background image based on the color temperature of the scene, such that the color temperature of the scene matches the color temperature of the background image.

15. The apparatus of claim 13, wherein adjusting the color temperature of the background image to be merged using the color temperature of the scene, such that the color temperature of the scene matches the color temperature of the background image comprises:

adjusting the color temperature of the background image to the color temperature of the scene; or weighting the color temperature of the scene and the color temperature of the background image to obtain a target color temperature; and adjusting the color temperature of the background image to the target color temperature.

16. The apparatus of claim 13, wherein acquiring the plurality of depth images of the current user comprises:

projecting structured light to the current user;

capturing a structured light image modulated by the current user; and demodulating phase information corresponding to each pixel of the structured light image to obtain one of the plurality of depth images.

17. The apparatus of claim 13, wherein processing each scene image of the first scene video based on the plurality of depth images, to acquire the portrait region of the current user in each scene image to obtain the portrait region image comprises:

identifying a face region in the scene image for each scene image;

acquiring depth information corresponding to the face region from the depth image;

determining a depth range of the portrait region based on the depth information of the face region; and determining the portrait region connected with the face region and having a depth within the depth range based on the depth range of the portrait region, to obtain the portrait region image.

18. A non-transitory computer readable storage medium, comprising a computer program that may be used in combination with an electronic device capable of photographing, wherein the computer program may be executed by a processor to implement an image processing method, the method comprising:

acquiring a background image and a portrait region image of a current user, a preset parameter of the background image matching the preset parameter of the portrait region image; and merging the portrait region image and the background image to obtain a merged image;

wherein the preset parameter comprises a color temperature, acquiring the background image and the portrait region image of the current user comprises:

detecting a color temperature of a scene where the current user is located;

adjusting an object to be merged based on the color temperature of the scene such that the color temperature of the object to be merged matches the color temperature of the scene; wherein the object to be merged is the background image and/or the portrait region image of the current user; or turning on a virtual light source matching the color temperature of the scene to adjust the color temperature of the background image to be merged, such that the color temperature of the scene matches the color temperature of the background image; or adjusting the color temperature of the background image to be merged using the color temperature of the scene, such that the color temperature of the scene matches the color temperature of the background image; or providing a fill light to the scene based on the color temperature of the scene, such that the color temperature of the scene matches the color temperature of the background image to be merged;

acquiring a first scene video of the current user;

acquiring a plurality of depth images of the current user; and processing each scene image of the first scene video based on the plurality of depth images, to acquire a portrait region of the current user in each scene image to obtain the portrait region image; and merging the portrait region image and the background image to obtain the merged image comprises: merging each portrait region image and a corresponding background image to obtain the merged image.

* * * * *